US012299149B2

(12) United States Patent
Nikoghossian et al.

(10) Patent No.: US 12,299,149 B2
(45) Date of Patent: May 13, 2025

(54) SECURE DEPLOYMENT OF DE-RISKED CONFIDENTIAL DATA WITHIN A DISTRIBUTED COMPUTING ENVIRONMENT

(71) Applicant: The Toronto-Dominion Bank, Toronto (CA)

(72) Inventors: Meline Nikoghossian, Toronto (CA); Wojciech Chowanski, Toronto (CA)

(73) Assignee: The Toronto-Dominion Bank, Toronto (CA)

( * ) Notice: Subject to any disclaimer, the term of this patent is extended or adjusted under 35 U.S.C. 154(b) by 263 days.

(21) Appl. No.: 17/745,703

(22) Filed: May 16, 2022

(65) Prior Publication Data

US 2022/0366064 A1   Nov. 17, 2022

Related U.S. Application Data

(60) Provisional application No. 63/189,484, filed on May 17, 2021.

(51) Int. Cl.
   *G06F 21/62*     (2013.01)
   *G06F 21/60*     (2013.01)
(52) U.S. Cl.
   CPC ........ *G06F 21/6209* (2013.01); *G06F 21/602* (2013.01)
(58) Field of Classification Search
   CPC ................. G06F 21/6209; G06F 21/602
   See application file for complete search history.

(56) References Cited

U.S. PATENT DOCUMENTS

| 8,161,070 | B2 | 4/2012 | Dipper |
| 9,092,502 | B1 | 7/2015 | Cannaliato et al. |
| 9,219,611 | B1 | 12/2015 | Naik |
| 9,582,680 | B2 | 2/2017 | Bilodeau et al. |
| 9,860,229 | B2 | 1/2018 | Miles et al. |
| 9,978,062 | B2 | 5/2018 | Raj |
| 10,402,376 | B2 | 9/2019 | Luthra et al. |
| 10,572,684 | B2 | 2/2020 | LaFever et al. |

(Continued)

FOREIGN PATENT DOCUMENTS

| WO | 2020238359 A1 | 12/2020 |
| WO | 2021061820 A1 | 4/2021 |

*Primary Examiner* — Vance M Little
(74) *Attorney, Agent, or Firm* — Nixon Peabody LLP

(57) ABSTRACT

In some examples, computer-implemented systems and processes deploy securely de-risked elements of confidential data within a distributed computing environment. For example, an apparatus may obtain configuration data associated with a source data table. The configuration data may specify an identifier of a column of the source data table that includes elements of confidential data, and based on the configuration data, the apparatus perform operations that anonymize the elements of confidential data within the column of the source data table and generate an anonymized column within the source data table. The apparatus may also perform operations that provision an anonymized data table that includes the anonymized column to at least one computing system, which may process the anonymized data table and generate an output data table that includes the anonymized column and maintains a referential integrity between the source data table and the output data table.

20 Claims, 11 Drawing Sheets

(56) References Cited

U.S. PATENT DOCUMENTS

| | | | |
|---|---|---|---|
| 10,592,525 | B1 | 3/2020 | Khante et al. |
| 10,764,297 | B2 | 9/2020 | Faulkner |
| 10,878,121 | B2 | 12/2020 | Yao et al. |
| 10,878,126 | B1 | 12/2020 | Koduru et al. |
| 10,929,384 | B2 | 2/2021 | Karunanithi et al. |
| 10,984,125 | B2 | 4/2021 | Bradley |
| 2006/0095791 | A1* | 5/2006 | Wong ................ G06F 21/64 713/189 |
| 2008/0065665 | A1* | 3/2008 | Pomroy ............... G06F 16/20 |
| 2018/0234234 | A1 | 8/2018 | Hurley et al. |
| 2019/0050599 | A1* | 2/2019 | Canard ............. H04L 9/0861 |
| 2020/0019558 | A1 | 1/2020 | Okorafor et al. |
| 2021/0097202 | A1 | 4/2021 | Datta et al. |
| 2022/0358237 | A1* | 11/2022 | Banipal ............ H04L 9/0894 |

* cited by examiner

SECURE DEPLOYMENT OF DE-RISKED CONFIDENTIAL DATA WITHIN A DISTRIBUTED COMPUTING ENVIRONMENT

CROSS-REFERENCE TO RELATED APPLICATION

This application claims the benefit of priority to U.S. Provisional Patent Application No. 63/189,484, filed on May 17, 2021, the entire disclosure of which is expressly incorporated herein by reference to its entirety.

TECHNICAL FIELD

The disclosed exemplary embodiments relate to computer-implemented systems and processes that deploy securely de-risked elements of confidential data within a distributed computing environment.

BACKGROUND

Today, financial institutions maintain confidential data characterizing not only their customers, but also the interactions between these customers and the financial institutions. The confidential data may be maintained across multiple file systems in database tables having corresponding, and often mutually incompatible, schemas, fields, and compositions, and confidentiality and privacy restrictions imposed on the financial institutions prevent any transmission of the confidential data to unrelated third parties without appropriate masking or obfuscation.

SUMMARY

In some examples, an apparatus includes a communications interface, a memory storing instructions, and at least one processor coupled to the communications interface and the memory. The at least one processor is configured to execute the instructions to obtain configuration data associated with a source data table. The configuration data includes an identifier of a column of the source data table that includes elements of confidential data. Based on the configuration data, the at least one processor is configured to execute the instructions to perform operations that anonymize the elements of confidential data within the column of the source data table. The anonymized elements of confidential data establishes an anonymized column within the source data table. The at least one processor is configured to execute the instructions to perform operations that provision an anonymized data table that includes the anonymized column to at least one computing system via the communications interface. The at least one computing system is configured to process the anonymized data table and generate an output data table that includes the anonymized column, and the anonymized column maintains a referential integrity between the source data table and the output data table.

In other examples, a computer-implemented method includes obtaining configuration data associated with a source data table using at least one processor. The configuration data includes an identifier of a column of the source data table that includes elements of confidential data. The computer-implemented method includes, based on the configuration data, performing operations, using the at least one processor, that anonymize the elements of confidential data within the column of the source data table. The anonymized elements of confidential data establish an anonymized column within the source data table. The computer-implemented method includes performing operations, using at least one processor, that provision an anonymized data table that includes the anonymized column to at least one computing system. The at least one computing system is configured to process the anonymized data table and generate an output data table that includes the anonymized column, and the anonymized column maintains a referential integrity between the source data table and the output data table.

Further, in some examples, a tangible, non-transitory computer-readable medium stores instructions that, when executed by at least one processor, cause the at least one processor to perform a method that includes obtaining configuration data associated with a source data table. The configuration data includes an identifier of a column of the source data table that includes elements of confidential data. The method includes, based on the configuration data, performing operations that anonymize the elements of confidential data within the column of the source data table. The anonymized elements of confidential data establish an anonymized column within the source data table. The method includes performing operations that provision an anonymized data table that includes the anonymized column to at least one computing system. The at least one computing system is configured to process the anonymized data table and generate an output data table that includes the anonymized column, and the anonymized column maintains a referential integrity between the source data table and the output data table.

The details of one or more exemplary embodiments of the subject matter described in this specification are set forth in the accompanying drawings and the description below. Other potential features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
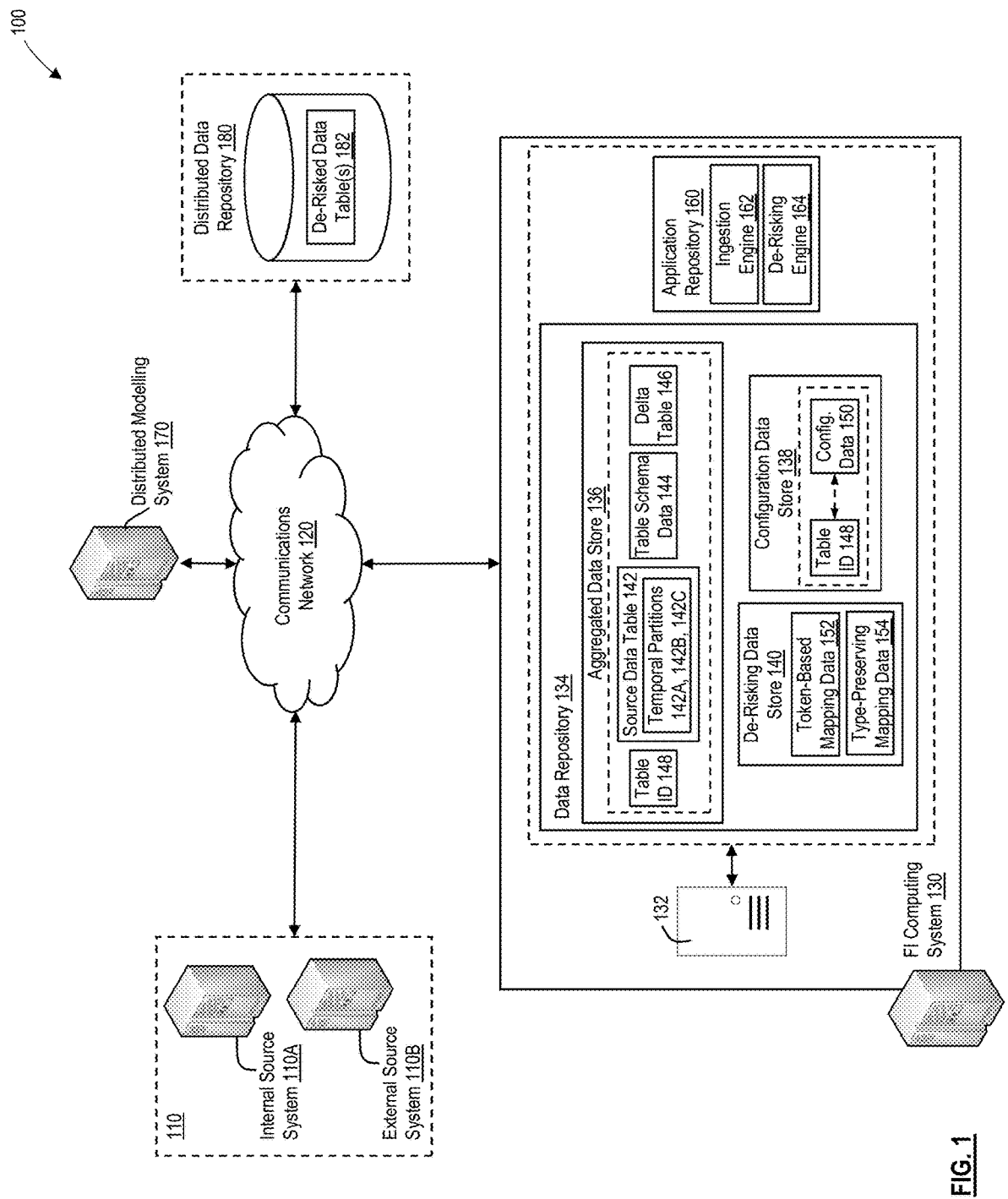
FIG. 1 is a block diagram of an exemplary computing environment, in accordance with some exemplary embodiments.

Modern financial institutions offer a variety of financial products or services to their customers, both through in-person branch banking and through various digital channels, and many customer-facing decisions, such as those related to a provisioning of a particular financial product or service to a customer, are often informed by the customer's relationship with the financial institution and the customer's use, or misuse, of various financial products or services. For example, one or more computing systems of a financial institution may obtain, generate, and maintain elements of customer profile data identifying the customer and characterizing the customer's relationship with the financial institution, elements of account data identifying and characterizing one or more financial products issued to the customer by the financial institution, elements of transaction data identifying and characterizing one or more transactions involving these issued financial products, or elements of reporting data, such as credit-bureau data associated with the particular customer. The elements of customer profile data, account data, transaction data, and/or reporting data may establish collectively a time-evolving risk profile for the customer, and the financial institution may base not only a decision to provision the particular financial product or service to the corresponding customer, but also a determination of one or more terms and conditions of the provisioned financial product or service, on the established risk profile.

The elements of confidential customer profile, account, transaction, and reporting data maintained by the one or more computing systems of the financial institution, which characterize a variety of customers having corresponding relationships with the financial institution and corresponding interactions with both the financial institution and various financial products our services, may represent a corpus of data suitable for training, and validating, one or more one or more machine-learning or artificial-intelligence processes across temporally disjoint training and validation intervals, especially in view of the increasing computational power afforded by distributed or cloud-based computing clusters of graphical processing units (GPUs) and tensor processing units (TPUs). In many instances, the one or more computing systems of the financial institution may maintain these elements of confidential customer profile, account, transaction, and reporting data across multiple, business-unit-specific file systems in database tables having corresponding, and often mutually incompatible schemas, fields, and compositions which limits an ability of the one or more computing systems of the financial institution to readily implement one or more data operations, such as SQL-based join operations, across the columns of these database tables.

Further, confidentiality and privacy restrictions imposed on the financial institutions by one or more regulatory, governmental, or judicial entities may prevent the computing systems of the financial institution from transmitting elements of the confidential customer data, such as that described herein, to the distributed or cloud-based computing clusters without appropriate masking or obfuscation. Instead, and to access the computational resources of many distributed or cloud-based computing clusters, the one or more computing systems of the financial institution may perform operations that "de-risk" elements of data tables that include confidential data prior to transmission to the distributed or cloud-based computing clusters. The de-risked data tables may, for example, obfuscate or mask any elements of sensitive confidential data, and/or may exclude certain elements of customer data, in accordance with the imposed confidentiality and privacy restrictions.

While certain cryptographic processes, such as encryption processes or hash tables, may exist to mask the elements of confidential customer data maintained within the data tables during transmission across the communications network, these processes, regardless of their robustness or complexity, may nonetheless be subject to reversal or reverse engineering by malicious third parties, e.g., through brute-force computational attacks. Further, while many tokenization processes may obfuscate, or mask, the elements of sensitive, confidential customer data when provisioned to distributed or cloud-based computing clusters across potentially insecure communication networks, these tokenization processes often leverage multiple, table-specific tokenization tables that maintain corresponding, table-specific digital tokens.

As the corresponding table-specific digital tokens often include randomly generated character strings of predetermined length composition unrelated to any elements of confidential customer data maintained within corresponding ones of the data table, these tokenization processes are often incapable of maintaining a format, structure, or a composition of the underlying elements of confidential customer data, which may render the tokenized elements of confidential data unsuitable for training, or subsequently validating, a machine-learning or artificial intelligence process during corresponding training and validation phases, Further, these existing cryptographic or tokenization processes are operate within conventional database environments, such as a relational database management system (RDBMS), and are often incapable of maintaining a referential integrity between tokenized, encrypted, hashed, or otherwise masked columns across discrete data tables, which facilitates a successful implementation of one or more SQL-based join operations involving these discrete data tables (e.g., prior to provisioning corresponding portions of the joined data tables to a distributed or cloud-based data repositories, much less any referential integrity between these tokenized, encrypted, hashed, or otherwise masked columns and corresponding columns of an output data table generated through an application of a trained machine-learning or artificial-intelligence process to portions of the joined data tables.

In some instances, the one or more computing systems of the financial institution may perform any of the exemplary processes described herein to selectively de-risk columns of sensitive, confidential customer data maintained within multiple, distinct source data tables while maintaining a referential integrity of the de-risked columns across the source data tables. By way of example, the one or more computing systems of the financial institution may implement one or more of the exemplary de-risking processes described herein to selectively, and reversibly, tokenize elements of customer-specific confidential data maintained within the multiple, distinct source data tables (or within corresponding temporal partitions of these source data tables) based on corresponding elements of configuration data, which may identify the one or more columns that include confidential data, and elements of token-based mapping data, which associate each of the elements of customer-specific confidential data within a digital token that obfuscates the element of customer-specific confidential data across multiple, distinct source data tables.

Further, and by way of example, the one or more computing systems of the financial institution may also implement one or more of the exemplary de-risking processes described herein to selectively, and reversibly (or in some instances, irreversibly) anonymize elements of customer-specific confidential data maintained within the multiple, distinct source data tables (or within corresponding temporal partitions of these source data tables) based on the corresponding elements of configuration data and on additional elements of type-preserving mapping data, which associate one or more elements of customer-specific confidential data with a corresponding element of anonymized data that obfuscates a corresponding element of customer-specific confidential data across multiple, distinct source data tables while maintaining a format, structure, or composition (e.g., a "data type") that characterizes the corresponding element of customer-specific confidential data. In some examples, the one or more computing systems of the financial institution may perform operations that provision portions of these "de-risked" source data tables generated through any implementation of one or more of the exemplary de-risking operations described herein to a cloud-based or distributed data repository, e.g., as a data pipelining process in support of a training, validation, or deployment of one or more machine-learning or artificial-intelligence processes.

Certain of the exemplary processes described herein, which obfuscate the elements of confidential customer data maintained within corresponding columns of multiple, distinct data tables based on data-element-specific digital tokens maintained within a single data structure (e.g., the elements of token-based mapping data) or based on data-type-preserving elements of anonymized data maintained within a single data structure (e.g., the elements of type-preserving mapping data), may maintain both a referential integrity between tokenized or anonymized columns across the multiple discrete data tables (e.g., which facilitates an implementation of one or more SQL-based join operations involving these discrete data tables) and a referential integrity between these tokenized or anonymized columns and corresponding columns of an output data table generated through an application of a trained machine-learning or artificial-intelligence process to portions of the joined data tables.

Further, by replacing the actual elements of confidential customer data within corresponding columns of the multiple, distinct source data tables with type-preserving elements of anonymized data, certain of these exemplary processes may enable one or more distributed or cloud-based computing clusters (e.g., associated with, or unrelated to, the financial institution) to process portions of the joined data tables that include the type-preserving elements of anonymized data and generate corresponding feature vectors that satisfy the one or more composition-specific, statistical benchmarks and that are suitable for ingestion by the machine-learning or artificial-intelligence processes during training, validation, and inferencing phases. In some instances, one or more of these exemplary de-risking processes may be implemented in addition to, or as an alternate, one or more of the existing encryption, hashing, or tokenization processes described herein, which often fail to maintain a referential integrity of the encrypted, hashed, or tokenized elements of confidential customer data across the columns of the multiple, distinct data tables, and which are often incapable or maintaining a format, structure, or composition of the underlying elements of confidential customer data.

I. Exemplary Computing Environments

FIG. 1 is a diagram illustrating an exemplary computing environment 100 that includes, among other things, one or more computing systems, such as, but not limited to, source systems 110 (including internal source system 110A and external source system 110B), a financial institution (FI) computing system 130, and a distributed modelling system 170, each of which may be operatively connected to, and interconnected across, one or more communications networks, such as communications network 120. Examples of communications network 120 include, but are not limited to, a wireless local area network (LAN), e.g., a "Wi-Fi" network, a network utilizing radio-frequency (RF) communication protocols, a Near Field Communication (NFC) network, a wireless Metropolitan Area Network (MAN) connecting multiple wireless LANs, and a wide area network (WAN), e.g., the Internet.

Source systems 110 (including internal source system 110A and external source system 110B), FI computing system 130, and distributed modelling system 170 may each represent a computing system that includes one or more servers and one or more tangible, non-transitory memory devices storing executable code, application engines, or application modules. Each of the one or more servers may include one or more processors, such as GPUs and/or TPUs, which may execute portions of the stored code, application engines, or application modules to perform operations consistent with the disclosed exemplary embodiments. For example, as illustrated in FIG. 1, the one or more servers of FI computing system 130 may include server 132 having one or more processors configured to execute portions of the stored code, application engines, or application modules maintained within the one or more corresponding, tangible, non-transitory memories. Further, each of source systems 110 (including internal source system 110A and external source system 110B), FI computing system 130, and distributed modelling system 170 may also include a communications interface, such as one or more wireless transceivers, coupled to the one or more processors for accommodating wired or wireless internet communication with other computing systems and devices operating within computing environment 100 (not illustrated in FIG. 1).

Further, in some instances, source systems 110 (including internal source system 110A, and external source system 110B), FI computing system 130, and distributed modelling system 170 may each be incorporated into a respective, discrete computing system. In additional, or alternate, instances, one or more of source systems 110 (including internal source system 110A, and external source system 110B), FI computing system 130, and distributed modelling system 170 may correspond to a distributed computing system having a plurality of interconnected, computing components distributed across an appropriate computing network, such as communications network 120 of FIG. 1. For example, FI computing system 130 and additional, or alternatively, distributed modelling system 170, may correspond, respectively, to a distributed or cloud-based computing cluster associated with, and maintained by, the financial institution, although in other examples, FI computing system 130 or distributed modelling system 170 may correspond, respectively, to a publicly accessible, distributed or cloud-based computing cluster, such as a computing cluster maintained by Microsoft Azure™, Amazon Web Services™, Google Cloud™, or another third-party provider.

As illustrated in FIG. 1, exemplary computing environment 100 may further include one or more distributed or cloud-based data repositories, such as a distributed data repository 180, established and maintained by, and accessible to, the interconnected computing components of one or more of the distributed computing systems operating within environment 100, such as, but not limited to FI computing system 130 and additionally, or alternatively, distributed modelling system 170. By way of example, distributed data repository 180 correspond to a high-density file system (HDFS) maintained by the interconnected computing components of FI computing system 130, which may include one or more databases maintaining corresponding, and distinct, de-risked data tables 182. As described herein, each of de-risked data tables 182 may each maintain de-risked elements of confidential data and elements of non-confidential data within corresponding columns, and each of the de-risked data tables 182 may be associated with a table schema, which identifies each of the columns maintained within the corresponding source data table (e.g., via a column name or field name), and which associates with each of the column names within a structure, format, or composition of corresponding elements of confidential or non-confidential data.

In some instances, each of FI computing system 130 and distributed modelling system 170 may include a corresponding plurality of interconnected, distributed computing components, such as those described herein (not illustrated in FIG. 1), which may be configured to implement one or more parallelized, fault-tolerant distributed computing and analytical processes (e.g., an Apache Spark™ distributed, cluster-computing framework, a Databricks™ analytical platform, etc.). Further, and in addition to the CPUs described herein, the distributed computing components of FI computing system 130, and additionally, or alternatively, the distributed computing components of distributed modelling system 170, may also include one or more graphics processing units (GPUs) capable of processing thousands of operations (e.g., vector operations) in a single clock cycle, and additionally, or alternatively, one or more tensor processing units (TPUs) capable of processing hundreds of thousands of operations (e.g., matrix operations) in a single clock cycle.

Through an implementation of the parallelized, fault-tolerant distributed computing and analytical protocols described herein, the distributed computing components of FI computing system 130 may perform any of the exemplary processes described herein to, among other things, ingest elements of confidential and non-confidential data associated with the customers of the financial institution, to store the ingested elements of confidential and non-confidential data within a temporal partition of one or more source data tables of a locally accessible data repository, and to perform operations that selectively preprocess and de-risk columns of confidential and non-confidential customer data maintained within the temporal partition of de-risked data tables 182, and in some instances, within the temporal partition of additional ones of the distinct source data tables. In some examples, described herein, the de-risked columns of confidential customer data within the temporal partitions of the distinct source data tables, may obfuscate or anonymize the elements of confidential customer data maintained within the de-risked columns, while maintaining a referential integrity of the de-risked columns, e.g., during subsequent SQL-based join operations, or during extract, transform, or load (ETL) operations, involving the de-risked columns of multiple, distinct source data tables Based on an application of one or more SQL-based join operations to the de-risked columns of confidential customer data maintained across the distinct source data tables, the distributed components of FI computing system 130 may generate a de-risked data table (e.g., one or more of the exemplary tokenized or anonymized data tables described herein), and may perform operations that provision the de-risked data table to distributed modelling system 170, e.g., directly across network 120 or by transmitting the de-risked data table across network 120 to one or more computing systems associated with a distributed or cloud-based or data repository accessible to distributed modelling system 170, such as distributed data repository 180. Further, and through an implementation of the parallelized, fault-tolerant distributed computing and analytical protocols described herein, the computing components of distributed modelling system 170, may perform operations in parallel that access the de-risked columns of customer data maintained within de-risked data tables 182, and may perform additional operations (e.g., corresponding extract, transform, or load (ETL) operations) in parallel that, based on the pre-processed and de-risked columns of customer data, generate corresponding datasets suitable for ingestion by one or more machine-learning or artificial-intelligence processes, e.g., during an adaptive training and validation process, or during an inferencing process.

Referring back to FIG. 1, each of source systems 110 may maintain, within corresponding tangible, non-transitory memories, a data repository that includes elements of confidential and non-confidential data associated with customers of the financial institution. For example, internal source system 110A may be associated with, or operated by, the financial institution, and may maintain, within the corresponding one or more tangible, non-transitory memories, a source data repository that includes one or more elements of customer profile data, account data, and transaction data that identify or characterize customers of the financial institution of FI computing system 130. Further, external source system 110B may also be associated with, or operated by, a third party unrelated to the financial institution, and maintain a source data repository that includes elements of third-party data. In some examples, the unrelated third party may include a reporting entity, such as a credit bureau, and the elements of third-party data may include elements of reporting data associated with the customers of the financial institution of FI computing system 130, such as, but not limited to, elements of credit-bureau data associated with, and generated by, one or more credit bureaus. Further, each of source systems 110, including internal source system 110A and external source system 110B, may perform operations that generate or obtain all, or a selected portion of the data records of customer profile data, account data, and transaction data, and reporting data associated with the customers, and that transmit the generated or obtained portions as source data across communications network 120 to FI computing system 130 in real-time and on a continuous streaming basis, on in batch form in accordance with a predetermined temporal schedule (e.g., on a daily basis, a monthly basis, etc.).

In some instances, one or more distributed components of FI computing system 130 may perform any of the exemplary processes described herein to execute one or more process-specific data pipelining operations associated with a corresponding machine learning or artificial intelligence process, such as, but not limited to, a gradient-boosted decision-tree process (e.g., an XGBoost process, etc.). By way of example, when implemented by the distributed components of FI computing system 130, the one or more process-specific data pipelining operations may cause FI computing system 130 to establish a secure, programmatic channel of communications with one or more of source systems 110 (e.g., via a secure, programmatic interface, such as an application programming interface (API) or via a performance of one or more robotic process automation (RPA) operations, etc.), and to obtain, via the secure, programmatic channel of communications, elements of confidential and non-confidential data characterizing customers of the financial institution from the one or more of source systems 110 in accordance with a predetermined, process-specific temporal schedule.

For example, and in accordance with the predetermined, process-specific temporal schedule, the distributed components of FI computing system 130 may obtain one or more elements of customer profile data, account data, and transaction data that identify or characterize customers of the financial institution from internal source system 110A, and may obtain one or more elements of credit-bureau data associated with these customers from external source system 1108. In some instances, the distributed components of FI computing system 130 may also perform operations, described herein, that store all, or a selected portion, of the customer-specific elements of customer profile data, account data, transaction data and credit-bureau data within a source data table maintained within a locally accessible data repository, such within a portion of a distributed file system (e.g., a Hadoop distributed file system (HDFS)) maintained by, and accessible to, the distributed components of FI computing system 130. The source data table may, for example, be associated with a corresponding table schema that identifies each of the columns maintained within the source data table (e.g., via a column name or field name) and that associates each of the column names within a structure, format, or composition of corresponding data elements.

Further, the distributed components of FI computing system 130 may also perform operations, described herein, that selectively join together (e.g., via an application of one or more of the SQL-based join operations) elements of data maintained within one or more columns of the source data table with elements of data maintained within corresponding columns of one or more additional source data tables of the locally accessible data repository, and additionally, or alternatively, that selectively exclude data maintained within the source data table, or from the additional source data tables, in accordance with one or more exclusion criteria. In some instances, the distributed components of FI computing system 130 perform operations that provision all, or a selected portion of the columns of the source data table and/or one or more of the additional source data tables, including the selectively joined columns described herein, across network 120 to distributed modelling system 170, or to one or more distributed data repositories, such as distributed data repository 180, which may be accessible to one or more additional, or alternate, computing systems operating within environment 100, such as, but not limited to, distributed modelling system 170. For example, distributed modelling system 170 may access the elements of data maintained within one or more columns of the source data table (e.g., including one or more of the selectively joined columns etc.), and based on the accessed elements of data, generate elements of customer- and process-specific input datasets suitable for ingestion by a machine learning or artificial intelligence process (e.g., a gradient-boosted decision-tree process, etc.) during corresponding training, validation, and/or inferencing operations.

As described herein, the elements of data maintained within the source data table, and within the one or more additional source data tables, may include both elements of confidential customer data and elements of non-confidential data. In some instances, certain confidentiality and privacy restrictions imposed on the financial institution by regulatory, governmental, or judicial entities, or self-imposed by the financial institution (e.g., in accordance with policies promulgated by one or more industry consortia, etc.), may limit of an ability off the distributed components of FI computing system 130 to provision directly any portion of the columns of the source data table and/or the additional source data tables to distributed data repository 180 absent a prior performance of operations that mask or obfuscate the elements of sensitive, confidential customer data maintained within the columns of these source data tables.

In some instances, the distributed components of FI computing system 130 may perform operations that selectively preprocess and de-risk columns of sensitive, confidential customer data maintained within multiple, distinct source data tables while maintaining a referential integrity of the preprocessed and de-risked columns across multiple, distinct source data tables. By way of example, the distributed components of FI computing system 130 may implement one or more of the exemplary de-risking processes described herein to selectively, and reversibly, tokenize elements of customer-specific confidential data maintained within a source data table (or within a temporal partition of that source data table) based on corresponding elements of configuration data, which may identify the one or more columns that include confidential data, and elements of mapping data, which associate each of the elements of customer-specific confidential data within value of a token that obfuscates the element of customer-specific confidential data across multiple, distinct source data tables.

Further, the distributed components of FI computing system 130 may also implement one or more of the exemplary de-risking processes described herein to selectively, and reversibly (or in some instances, irreversibly) anonymize elements of customer-specific confidential data maintained within one or more columns of a source data table (or within a temporal partition of that source data table) based on the corresponding elements of configuration data and on additional elements of mapping data, which associate one or more of elements of customer-specific confidential data with an element of anonymized data that obfuscates a corresponding element of customer-specific confidential data across multiple, distinct source data tables while maintaining a structure or a format that characterizes the corresponding element of customer-specific confidential data. In some examples, the distributed components of FI computing system 130 may perform operations that provision a "de-risked" source data table through any implementation of one or more of the exemplary de-risking operations described herein to one or more cloud-based or distributed data repositories, such as distributed data repository 180 e.g., as a data pipelining process in support of a training, validation, or deployment of one or more machine-learning or artificial-intelligence processes.

To facilitate a performance of one or more of these exemplary processes, the distributed components of FI computing system 130 may establish and maintain, within the one or more tangible, non-transitory memories, a data repository 134 that includes, but is not limited to, an aggregated data store 136, a configuration data store 138, and a de-risking data store 140. Data repository 134 may, for example, correspond to a data lake, a data warehouse, or another centralized repository established and maintained, respectively, by the distributed components of FI computing system 130, e.g., through a Hadoop™ distributed file system (HDFS).

In some instances, aggregated data store 136 may include one or more source data tables, such as source data table 142, that maintain, within corresponding columns, elements of the confidential and non-confidential customer data obtained from source systems 110 during a current temporal interval and during one or more prior temporal intervals (e.g., the elements of customer profile, account, or transaction data obtained from internal source system 110A and the elements of credit-bureau data obtained from external source system 110B, etc.). Further, aggregated data store 136 may maintain each of the source data tables in conjunction with, or in associated with, a one or more elements of table schema data, such as, but not limited to, elements of table schema data 144 associated with source data table 142. As described herein, the elements of table schema data 144 may identify each of the columns maintained within source data table 142 (e.g., via a column or field name), and may associates each of the column names with a structure, format, or composition of corresponding ones of the elements of confidential or non-confidential data.

By way of example, source data table 142 may include, among other things, a column that maintains a customer account number for a plurality of customer of the financial institution, and the elements of table schema data 144 may specify a column name (e.g., "ACCOUNT NUMBER," etc.) for the column and may associate the column name with corresponding elements of formatting data that specify each of the confidential customer account numbers include sixteen numerical digitals. Source data table 142 may also include, among other things, an additional column that maintains a birthdate of a plurality of customers of the financial institution, and the elements of table schema data 144 may specify a column name (e.g., "BIRTHDAY," etc.) for the additional column and may associate the column name with corresponding elements of formatting data that specify each of the customer birthdates includes six formatted, numerical digits (e.g., structured as "YYYYMMDD").

Additionally, in some examples, source data table 142 may include, among other things, further columns that specify, respectively, a postal code associated with a residence of a plurality of customers of the financial instances and an email address of one or more of the customers of the financial institution. For the further column associated with the postal code, the elements of table schema data 144 may specify a column name (e.g., "POSTAL CODE," etc.), and may associate the column name with corresponding elements of formatting data that specify each of the postal codes include a predetermined number of numerical digits (e.g., six numerical digitals, etc.) or a predetermined combination of alphanumeric characters. In some instances, and for the further column associated with the email address, the elements of table schema data 144 may specify a column name (e.g., "EMAIL," etc.), and may associate the column name with corresponding elements of formatting data that specify each of the email addresses include and alphanumeric character string having one or more predetermined alphanumeric characters (e.g., the characters "@" and ".") and one of a predetermined set of top-level domain names (e.g., ".com," ".gov," ".edu," etc.). The disclosed embodiments are, however, not limited to source data tables that include these exemplary data columns or data formats, and in other instances, the source data tables maintained within aggregated data store 136 may include any additional, or alternate, data columns maintaining data structured in accordance with any additional, or alternate, formats consistent with the elements of confidential and non-confidential data maintained by source systems 110.

Further, and as described herein, portions of the elements of confidential and non-confidential data maintained within the columns of one or more of the source data may be disposed within respective ones of a plurality of temporal partitions associated with a corresponding temporal interval of a predetermined or varying duration. As illustrated in FIG. 1, source data table 142 may include temporal partitions 142A, 142B, and 142C, and in some instances, temporal partitions 142A, 142B, and 142C may be associated with temporal intervals extending, respectively, from Feb. 1, 2022, to Feb. 28, 2022, from Mar. 1, 2022, to Mar. 31, 2022, and from Apr. 1, 2022, to Apr. 30, 2022. By way of example, and for a particular temporal partition of source data table 142 associated with a particular one of the distinct temporal intervals, such as temporal partition 142B associated with the temporal interval extending from Mar. 1, 2022, to Mar. 31, 2022, the distributed components of FI computing system 130 may perform operations, described herein, that obtain the corresponding elements of confidential and non-confidential customer data maintained within temporal partition 142B of source data table 142 from respective ones of source data systems 110 during that particular temporal interval extending from Mar. 1, 2022, to Mar. 31, 2022. The disclosed embodiments are however, not limited to three temporal partitions associated with predetermined temporal intervals of one-month duration, and in other instances, the source data tables maintained within aggregated data store 136 may include any additional, or alternate, number of temporal partitions associated with temporal intervals having any addition, or alternate, predetermined or varying duration, such as, but not limited to, a financial quarter, a calendar month, a business week, or a twenty-four hour period.

Additionally, in some examples, aggregated data store 136 may also maintain each of the source data tables in conjunction with, or in associated with, a corresponding delta table, such as, but not limited to, delta table 146 associated with source data table 142 (and with the elements of table schema data 144). Each delta table may, for instance, identify and characterize one or more of the temporal partitions of a corresponding one of the source data tables maintained within aggregated data store 136 and, further, identify one or more prior preprocessing and/or de-risking operations applied to one or more of the temporal partitions, as well as one or more temporal partitions awaiting preprocessing and/or de-risking, any of the exemplary processes described herein. By way of example, delta table 146 identify each of temporal partitions 142A, 142B, and 142C of source data table 142 and the temporal intervals associated with temporal partitions 142A, 142B, and 142C, e.g., the temporal intervals extending from Feb. 1, 2022, to Feb. 28, 2022, from Mar. 1, 2022, to Mar. 31, 2022, and from Apr. 1, 2022, to Apr. 30, 2022, respectively. Further, delta table 146 may also include data that identifies one or more prior preprocessing and/or de-risking applied to temporal partitions 142A, 142B, and 142C, and that specifies one or more of temporal partitions 142A, 142B, and 142C awaiting preprocessing and/or de-risking, using any of the exemplary processes described herein.

In some instances, and through the maintenance of the delta table associated with each of the source data tables, such as delta table 146 associated with source data table 142, the distributed components of FI computing system 130 may apply the one or more of the exemplary pre-processing or de-risking operations described herein to columns of confidential or non-confidential data maintained within those temporal partitions awaiting pre-processing or de-risking, to portions of columns of confidential or non-confidential data maintained within those temporal partitions awaiting pre-processing or de-risking, and/or to columns of confidential or non-confidential data maintained within portions of temporal partitions awaiting pre-processing or de-risking that span a customized temporal interval, e.g., five hours. Further, as illustrated in FIG. 1, aggregated data store 136 may maintain each of the source data tables in conjunction with, or in association with, a corresponding table identifier, such as, but not limited to, table identifier 148 associated with source data table 142, table schema data 144, and delta table 146. In some instances, each of the table identifiers of the source data tables, including table identifier 148 of source data table 142, may include an alphanumeric character string of a predetermined length, and may be assigned to the corresponding one of the source data tables by the distributed components of FI computing system 130, e.g., upon storage within aggregated data store 136, etc.

Configuration data store 138 may include structured or unstructured data records that include, for each of the source data tables maintained within aggregated data store 136, elements of configuration data that identify columns within corresponding ones of the source data tables that are subject to one or more of the exemplary, pre-processing, exclusion, or de-risking operations described herein, along with additional information identifying each of the pre-processing operations application to the columns of the corresponding ones of the source data tables. By way of example, and for a particular one of the source data tables, such as data table 142, the data records of configuration data store 138 may associate table identifier 148 (and in some instances, a unique identifier of a database that maintains source data table 142) and one or more elements of configuration data 150.

In some instances, the one or more elements of configuration data 150 may include data identifying one or more of the columns of source data table 142 that maintain elements of confidential customer data and as such, that are subject to one or more of the exemplary de-risking operations described herein, e.g., prior to a provisioning of source data table 142 to one or more cloud-based or distributed data repositories accessible to computing devices and systems operating within environment 100, such as distributed data repository 180. The data identifying each of the one or more columns of source data table 142 may, for example, include a corresponding column name or a field name consistent with table schema data 144, and as described herein, the application of the exemplary de-risking operations to the elements of confidential customer data maintained within the identified columns of data table 142 may maintain a referential integrity of these identified columns during a performance of SQL-based join operations (or other SQL-based operations) involving source data table 142 and other source data tables maintained within aggregated data store 136.

The one or more elements of configuration data 150 may include data identifying columns of source data table 142 (e.g., the corresponding column or field name) that are subject to one or more of the exemplary pre-processing operations described herein and additionally, or alternatively, that are subject to exclusion from any processed data set provisioned to the one or more cloud-based or distributed data repositories accessible to computing devices and systems operating within environment 100, such as distributed data repository 180. Further, and for those columns of source data table 142 subject to the one or more pre-processing operations, the elements of configuration data 150 may also include information that identifies, and characterizes, each of the applicable pre-processing operations. Examples of the pre-processing operations may include, but are not limited to: (i) a full-redaction operation that redacts fully an element of confidential customer data maintained within an identified column of a source data table 142 (e.g., pre-processing a column of source data table 142 to replace actual instances of email address with the character string "YES," and to replace null values with the string "NO," etc.); and (ii) a partial-redaction operation that redacts partially an element of confidential customer data maintained within an identified column of a source data table 142 (e.g., pre-processing a column of source data table 142 that maintains a customer postal codes to maintain only a predetermined portion of each of the customer postal codes, such as three characters, etc.).

The disclosed embodiments are, however, not limited to these exemplary pre-processing operations, and in other examples, the pre-processing operations identified and characterized by the elements of configuration data 150 may include any additional or alternate pre-processing operations consistent with the elements of confidential and non-confidential customer data maintained within source data table 142 and appropriate to the confidentiality and privacy restrictions imposed on the financial institution. Further, although not illustrated in FIG. 1, configuration data store 138 may also maintain additional elements of configuration data that identify and characterize the pre-processing, exclusion or de-risking operations application to the columns of each additional, or alternate, source data table maintained within aggregated data store 136.

Referring back to FIG. 1, de-risking data store 140 may maintain one or more elements of de-risking data that facilitate an application of one or more of the exemplary de-risking operations described herein to a column of confidential customer data maintained within a single source data table, such as source data table 142, or to a column of confidential customer data maintained similarly across multiple source data tables and/or multiple databases, within aggregated data store 136. In some instances, de-risking data store 140 may include one or more elements of token-based mapping data 152 that associate distinct, but contextually consistent, elements of the confidential customer data maintained within the source data tables of aggregated data store 136 with corresponding, and unique, digital tokens, which may obfuscate corresponding the distinct, contextually consistent elements of the confidential customer data within the source data tables maintained within aggregated data store 136 (e.g., within a single database or across multiple databases maintained by the distributed components of FI computing system 130). Each of the unique digital tokens may, for example, include a randomly generated alphanumeric character string having a predetermined length (e.g., thirty-two characters), which may reduce occurrences of collisions between corresponding ones of the digital tokens and the tokenized elements of confidential customer data.

In some examples, a particular element of confidential customer data associated with a corresponding customer of the financial institution, such as a customer identifier of the corresponding customer or an account identifier of a financial product held by the corresponding customer, may be maintained across the source data tables of aggregated data store 136 (including source data table 142) in a common format, structure, or composition across the source data tables. In some instances, the elements of token-based mapping data 152 may associate the particular element of confidential customer data with a corresponding, and a unique value, of a digital token, which may obfuscate the particular element of confidential customer data within corresponding columns of the source data tables maintained within aggregated data store 136.

Additionally, in some examples, a particular element of confidential customer data associated with a corresponding customer of the financial institution, such as the customer identifier of the corresponding customer may be maintained across the source data tables of aggregated data store 136 (including source data table 142) in different, table-specific formats, structures, or compositions (e.g., a full customer name or a portion of the customer name, a full social security number, or a portion of the social security number, such as the last four digits, etc.). In some instances, the elements of token-based mapping data 152 may associate a unique digital token with each of the different, but contextually consistent, the formats, structures, or compositions of the particular element of confidential customer data associated with a corresponding customer, which may obfuscate the particular element of confidential customer data within corresponding columns of one or more of the source data tables maintained within aggregated data store 136. By mapping distinct, but contextually consistent, elements of confidential customer data associated with a corresponding customer (e.g., the differently formatted, structured, or composed values of the customer identifier) to a common, and unique, digital token, the distributed components of FI computing system 130 may perform one or more of the exemplary de-risking operations described herein to tokenize reversibly the particular element of confidential customer data across the columns of one or more of the source data tables, and to obfuscate the differently formatted, structured, or composed values of the particular element of confidential customer data within each of these source data tables, using the unique digital token, while maintaining a referential integrity of the columns within the data tables.

The disclosed embodiments are, however, not limited to elements of token-based mapping data that associate variously formatted, structured, or composed values of a customer identifier with a value of a corresponding digital token, and in other examples, token-based mapping data 152 may include further elements that associate distinct, but contextually consistent, values of one or more additional, or alternate, elements of the confidential customer data maintained within the source data tables of aggregated data store 136 with corresponding values of additional, and unique, digital tokens. As described herein, each of these additional digital tokens may include a corresponding, and distinct, randomly generated alphanumeric character string having a predetermined length (e.g., thirty-two characters), which may obfuscate corresponding ones of the distinct, contextually consistent values of the additional, or alternate, elements of the confidential customer data within the source data tables maintained within aggregated data store 136 (e.g., within a single database or across multiple databases maintained by the distributed components of FI computing system 130). Certain of these exemplary processes may facilitate customized, SQL-based join operations across one or more of the source data tables maintained within aggregated data store 136 (e.g., within multiple, distinct database), may reduce a number of tables needed for tokenization and de-risking, and further, may facilitate a classification of the source data tables for customized use or tests cases, e.g., for provisioning to the one or more cloud-based or distributed data repositories accessible to computing devices and systems operating within environment 100, such as distributed data repository 180.

Based the one or more elements of token-based mapping data 152, the distributed components of FI computing system 130 may perform one or more of the de-risking operations described hereon to tokenize corresponding columns of the source data tables maintained within aggregated data store 136 and replace the elements of confidential customer data maintained within these columns with corresponding ones of the digital tokens maintained within the elements of token-based mapping data 152. Although these exemplary, token-based de-risking processes may obfuscate the elements of confidential customer data maintained within the source data tables provisioned to the one or more cloud-based or distributed data repositories accessible to computing devices and systems operating within environment 100 (e.g., distributed data repository 180), these exemplary token-based risking operations may be incapable of maintaining a format, structure, or composition of the now-tokenized elements of confidential customer data.

In some instances, de-risking data store 140 may also include one or more elements of type-preserving mapping data 154 that associate actual elements of confidential customer data, which may be maintained within the columns of the source data tables in table-specific formats, structures, or compositions, with elements of type-preserving anonymized data that maintain the table-specific formats, structures, or compositions characterizing corresponding ones of the actual elements of confidential customer data (e.g., a preserve a "data type" associated with the corresponding ones of the actual elements of confidential customer data). By way of example, an actual element of confidential customer data maintained within the columns of source data table 142 may include a customer phone number (e.g., "1-202-555-1234") characterized by a corresponding, table-specific composition that includes a country code of length between one and three digits (e.g., "1"), a three-digit area code (e.g., "202"), and three-digital prefix (e.g., "555"), and four-digit line number (e.g., "1234"), and a corresponding, table-specific structure specifying that a dash (e.g., "-") separate the country code from the area code, the area code from the prefix, and the prefix from the line number.

Further, in some examples, the elements of type-preserving mapping data 154 may associate the actual customer phone number maintained within the source data table 142 (e.g., "1-202-555-1234") with a corresponding, element of type-preserving anonymized data (e.g., "9-999-999-9999") that masks fully each element of the actual customer phone number while maintaining the table-specific composition and structure of the actual customer phone number. The elements of type-preserving mapping data 154 may also associate the actual customer phone number maintained within the source data table 142 (e.g., "1-202-555-1234") with an additional, or alternate, element of type-preserving anonymized data (e.g., "1-202-999-9999") that masks fully a predetermined portion of the actual customer phone number (e.g., the prefix "555" and the line number "1234"), while maintaining an additional, predetermined portion of the actual customer phone number in unmasked form (e.g., the country code "1" and the area code "202").

The disclosed embodiments are, however, not limited to, actual elements of confidential customer data that include customer telephone numbers, and in other instances, the one or more elements of type-preserving mapping data 154 may associate any additional, or alternate, actual element of confidential customer data maintained within the columns of the source data tables of aggregated data store 136 with a corresponding element of fully, or partially, anonymized data that maintains the table-specific format, structure, or compositions characterizing the additional, or alternate, actual element of confidential customer data (e.g., the preserve the "data type" associated with the additional, or alternate, actual element of confidential customer data). By associating the actual elements of confidential customer data maintained within the columns of the source data tables with elements of fully, or partially, anonymized data that preserve the data type of the corresponding actual elements of confidential customer data, the one or more elements of type-preserving mapping data 154 enable the distributed components of FI computing system 130 to maintain a referential integrity of the columns of the source data tables maintained within aggregated data store 136 during not only a performance of one or more of the exemplary de-risking processes described herein, but also during an implementation of one or more SQL-based join operations involving these source data tables.

By obscuring one or more of the actual elements of confidential data maintained within the columns of the source data using elements of fully or partially anonymized data that preserve a table-specific format, structure, or composition of corresponding ones of the actual elements of confidential data, certain of the exemplary processes described herein may enable one or more computing systems operating within environment 100, such as distributed modelling system 170, to access the source data tables that include one or more columns populated with the elements of type-preserving anonymized data (e.g., as provisioned to distributed data repository 180) and generate elements of customer- and process-specific input datasets suitable for ingestion by a machine learning or artificial intelligence process during corresponding training, validation, and/or inferencing operations based on, among other things, an application of one or more extract, transform, and load (ETL) operations columns of the source data tables that include the elements of type-preserving, anonymize data. Further, by obscuring one or more of the actual elements of confidential data maintained within the columns of the source data using elements of partially anonymized data that include a selected portion of, and that preserve a table-specific format, structure, or composition of, corresponding ones of the actual elements of confidential data, certain of the exemplary processes described herein may facilitate a generation, by distributed modelling system 170, of elements of the customer- and process-specific input datasets that satisfying one or more composition-specific, statistical benchmarks.

To facilitate the performance of any of the exemplary processes described herein, the distributed components of FI computing system 130 may also maintain, within the one or more tangible, non-transitory memories, an application repository 160 that stores one or more executable application engines, modules, or programs, elements of code, or code modules. By way of example, as illustrated in FIG. 1, application repository 160 may include, among other things, an ingestion engine 162 and a de-risking engine 164. In some instances, and upon execution by one or more of the processors of FI computing system 130, executed ingestion engine 162 may perform any of the exemplary processes described herein to establish, via a corresponding communications interface of FI computing system 130, a secure, programmatic channel of communication with each of source systems 110, including internal source system 110A and external source system 110б, across network 120, and to perform operations that access and obtain all, or a selected portion, of the elements confidential and non-confidential data characterizing customers of the financial institution from corresponding ones of source systems 110.

Examples of the elements of confidential and non-confidential customer data may include, but are not limited to, elements of customer profile data, elements of account data, elements of transaction data, elements of credit-bureau data, or other elements of structured or unstructured confidential data that characterize the customers of the financial institution and their interactions with the financial institution during one or more current or prior temporal intervals. Further, in some instances, executed ingestion engine 162 may obtain the elements of confidential and non-confidential customer data from corresponding ones of source systems 110 in accordance with a predetermined temporal schedule, such as, but not limited to, on a daily basis, a weekly basis, a bi-monthly basis, a monthly basis, or a quarterly basis.

Executed ingestion engine 162 may also perform operations, described herein, that access one or more source data tables maintained within aggregated data store 136, such as source data table 142 having temporal partitions 142A, 142B, and 142C, and elements of table schema data associated with each of the accessed source data tables, such as the elements of table schema data 144 associated with source data table 142. As described herein, the elements of table schema data may identify each of the columns maintained within a corresponding one of the accessed source data tables (e.g., via a column or field name), and may associate each of the column or field names with a structure, format, or composition of corresponding ones of the elements of confidential or non-confidential data.

In some instances, executed ingestion engine 162 may perform any of the exemplary processes described herein to store the elements of the obtained confidential and non-confidential customer data within corresponding columns of one or more of the accessed source data tables in accordance with respective elements of the obtained table schema data (e.g., within an existing temporal partition of at least one of the accessed source data table, or within a newly established temporal partition of at least one of the accessed source data table that is associated with a temporal interval during which executed ingestion engine 162 obtained the elements of confidential and non-confidential customer data). By way of example, and as described herein, executed ingestion engine 162 may store the obtained elements of confidential and non-confidential customer data within corresponding columns of an existing temporal partition of source data table 142 in accordance with the elements of table schema data 144, or may perform any of the exemplary processes described herein to establish a new temporal partition of source data table 142 (e.g., based on portion of delta table 146) and to store the obtained elements of confidential and non-confidential customer data within corresponding columns of the newly establish temporal partition in accordance with the elements of table schema data 144.

Further, upon execution by the one or more processors of FI computing system 130, executed de-risking engine 164 may perform any of the exemplary processes described herein to preprocess and de-risk columns of confidential and non-confidential customer data maintained within the multiple, distinct source data tables of aggregated data store 136 while maintaining a referential integrity of the preprocessed and de-risked columns during post-processing operations that join together via SQL-based join operations certain of the columns of the multiple, distinct source data tables, or that exclude certain of the columns from the multiple, distinct source data tables. By way of example, executed de-risking engine 164 may perform one or more of the exemplary de-risking processes described herein to selectively, and reversibly, tokenize elements of customer-specific confidential data maintained within a source data table (or within a temporal partition of that source data table) based on corresponding elements of configuration data maintained within configuration data store 138, which may identify the one or more columns that include confidential data, and elements of token-based mapping data maintained within de-risking data store 140, which associate each of the elements of customer-specific confidential data within value of a digital token that obfuscates the element of customer-specific confidential data across the multiple, distinct source data tables.

Executed de-risking engine 164 may also perform one or more of the exemplary de-risking processes described herein to selectively, and reversibly (or in some instances, irreversibly) anonymize elements of customer-specific confidential data maintained within one or more columns of a source data table (or within a temporal partition of that source data table) based on the corresponding elements of configuration data and on elements of type-preserving mapping data maintained within de-risking data store 140, which associate one or more of elements of customer-specific confidential data with an element of fully or partially anonymized data that obfuscates a corresponding element of customer-specific confidential data across multiple, distinct source data tables while maintaining a table-specific format, structure, or composition of the corresponding element of customer-specific confidential data. Further, executed de-risking engine 164 may also perform any of the exemplary processes described herein to implement selectively one or more SQL-based join operations between the de-risked and/or pre-processed columns of the source data tables, and additionally or alternatively, that implement selectively one or more exclusion operations described herein.

Further, executed de-risking engine 164 may perform any of the exemplary processes described herein to provision one or more of the selectively pre-processed, de-risked, and in some instances post-processed, source data tables to distributed modelling system 170, or to one or more cloud-based or distributed data repositories accessible across network 120 to computing devices and systems operating within environment 100, such as distributed data repository 180. In some examples, executed de-risking engine 164 may provision the one or more source data tables to distributed data repository 180 as a portion of a data pipelining process that supports of a training, validation, or deployment of one or more machine-learning or artificial-intelligence processes by distributed modelling system 170.

II. Exemplary Processes for De-Risking Source Data Tables while Maintaining Referential Integrity As described herein, the distributed components of FI computing system 130 may establish and maintain, within data repository 134, aggregated data store 136 that includes one or more source data tables, such as source data table 142. In some instances, each of the source data tables within aggregated data store 136, including source data table 142, may maintain, within corresponding columns, elements of the confidential and non-confidential customer data obtained from source systems 110 during a current temporal interval and during one or more prior temporal intervals (e.g., the elements of customer profile, account, or transaction data obtained from internal source system 110A and the elements of credit-bureau data obtained from external system 110B, etc.). Further, and as described herein, the elements of confidential and non-confidential data maintained within the columns of one, or more, of the source data tables may be disposed within respective ones of a plurality of temporal partitions associated with a corresponding temporal interval of a predetermined or varying duration.

By way of example, source data table 142 may include temporal partition 142A associated with a temporal interval extending from Feb. 1, 2022, to Feb. 28, 2022, temporal partition 142B associated with a temporal interval extending from Mar. 1, 2022, to Mar. 31, 2022, and temporal partition 142C associated with a temporal interval extending from Mar. 1, 2022, to Apr. 1, 2022, to Apr. 30, 2022. Further, and as described herein, the distributed components of FI. computing system 130 may obtain (e.g., "ingest") the elements of the confidential and non-confidential customer data maintained within the columns of each of temporal partitions 142A, 142B, and 142C of source data table 142 from one or more of source systems 110 during corresponding ones of the temporal intervals, e.g., during temporal intervals extending, respectively, from Feb. 1, 2022, to Feb. 28, 2022, from Mar. 1, 2022, to Mar. 31, 2022, and from Apr. 1, 2022, to Apr. 30, 2022.

In some instances, aggregated data store 136 may maintain each of the source data tables, including source data table 142, in conjunction with, or in association with, one or more elements of table schema data, such as, but not limited to, elements of table schema data 144 associated with source data table 142, and a corresponding delta table, such as, but not limited to, delta table 146 associated with source data table 142. As described herein, the elements of table schema data 144 may identify each of the columns maintained within source data table 142 (e.g., via a column or field name), and may associate each of the column names with a structure, format, or composition of corresponding ones of the elements of confidential or non-confidential data. Further, delta table 146 may identify and characterize temporal partitions 142A, 142B, and 142C and the corresponding temporal intervals, and may identify one or more prior preprocessing and/or de-risking operations applied to one or more of the temporal partitions, as well as one or more temporal partitions awaiting preprocessing and/or de-risking, any of the exemplary processes described herein.

Figure 2A:
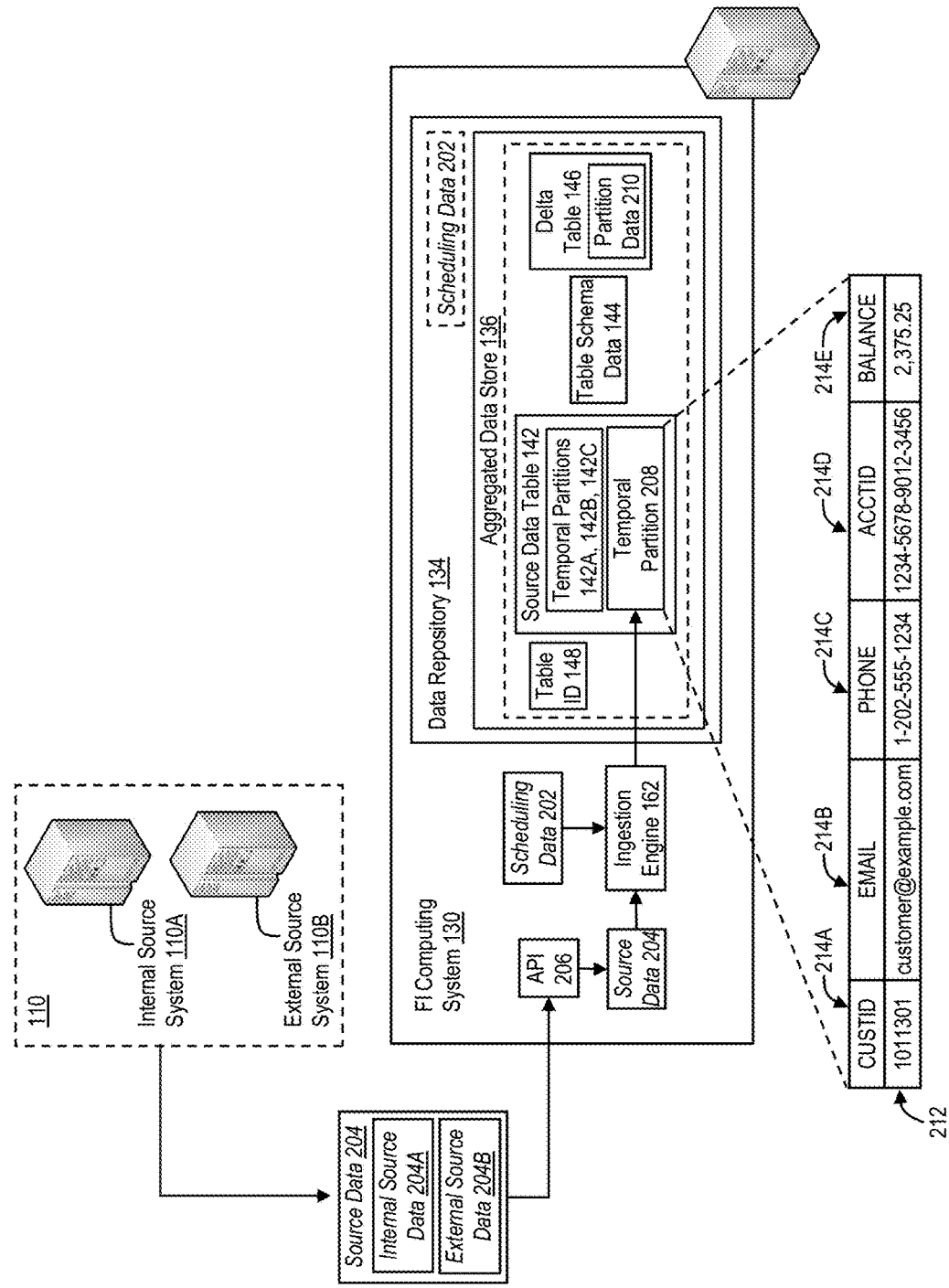
FIGS. 2A, 2B, 3A-3D, and 4 are block diagrams illustrating portions of an exemplary computing environment, in accordance with some exemplary embodiments.

Referring to FIG. 2A, and in addition to the source data tables, the corresponding elements of table schema data and the corresponding delta tables, data repository 134 may also maintain one or more elements of scheduling data 202, which may specify a predetermined temporal schedule associated with an ingestion, by the distributed components of FI computing system 130, of the elements of confidential and non-confidential customer data maintained by one or more of source systems 110. By way of example, the elements of scheduling data 202 may specify that the distributed components of FI computing system 130 perform any of the exemplary processes to obtain elements of the confidential and non-confidential customer data from one or more of source systems 110 (including internal source system 110A or external source system 110B) on a weekly basis, a bi-monthly basis, a monthly basis, or a quarterly basis.

By way of example, and upon execution by the one or more processors of FI computing system 130 (e.g., one or more of the distributed components described herein), executed ingestion engine 162 may perform operations that obtain the one or more elements of scheduling data 202. Based on the one or more elements of scheduling data 202, executed ingestion engine 162 may perform operations that cause FI computing system 130 to establish a secure, programmatic channel of communications with one or more source systems 110, and to request and receive one or more elements of source data 204 from corresponding ones of internal source system 110A and external source system 110B across the secure, programmatic channel of communications. By way of example, as illustrated in FIG. 2A, a programmatic interface, such as application programming interface (API) 206, may receive the elements of source data 204 from corresponding ones of internal source system 110A and external source system 110B, and API 206 may route the received elements of source data 204 to executed ingestion engine 162.

As illustrated in FIG. 2A, the elements of source data 204 may include elements of confidential and non-confidential customer data that identify and characterize all, or a predetermined or selected subset, of the customers of the financial institution, and may characterize interactions between the customers and the financial institution, and the between the customer and other financial institutions, regulatory entities, governmental entities, or judicial entities across one or more temporal intervals. For example, the elements of source data 204 may include one or more elements of internal source data 204A maintained by internal source system 110A, and the elements of internal source data 204A may include, but are not limited to, elements of customer profile data, account data, transaction data, or other information identifying and characterizing corresponding customers of the financial institution. The elements of source data 204 may also include one or more elements of external source data 204B maintained by external source system 110B, and examples of the elements of external source data 204B include, but are not limited to, elements of credit-bureau data generated or maintained on behalf of corresponding customers by a corresponding reporting agency (e.g., a customer-specific credit score, a customer-specific number of credit inquiries, etc.).

Further, in some instances, each of the elements of internal source data 204A and external source data 204B may be associated with a corresponding one of the customers of the financial institution (and may include a corresponding customer identifier, such as an alphanumeric identifier assigned by the financial institution, portions of a customer name, or a numerical identifier assigned by a governmental entity, such as a social security number or a driver's license number). Each of the elements of internal source data 204A and external source data 204B may be associated with a corresponding temporal identifier, which may indicate a time or date at which a respective one of internal source system 110A or external source system 110B generated or stored the corresponding element of internal source data 204A and external source data 204B. The disclosed embodiments are, however, not limited to these exemplary elements of internal and external source data, and in other examples, source data 204 may include any additional or alternate elements of confidential or non-confidential customer data that identify or characterize the customers of the financial institution or the interactions of these customers with the financial institution or with other financial institutions.

By way of example, the elements of scheduling data 202, may indicate that executed ingestion engine 162 is scheduled to obtain elements of confidential and non-confidential customer data from corresponding ones of source systems 110 on a monthly basis, e.g., on a final day of each month at 8:00 μm. In some instances, on May 31, 2022, at 8:00 p.m., executed ingestion engine 162 may perform any of the exemplary processes described herein to request and receive one or more elements of source data 204 (including the elements of internal source data 204A and external source data 204B) from corresponding ones of internal source system 110A and external source system 110B across the secure, programmatic channel of communications, and the temporal identifier associated each of the elements of internal source data 204A and external source data 204B may indicate that a respective one of internal source system 110A or external source system 110B generated or stored the corresponding element during a temporal interval ranging from May 1, 2022, to May 31, 2022.

Executed ingestion engine 162 may receive the elements of source data 204 (including the elements of internal source data 204A and external source data 204B) from API 206, and may access one or more of the stored data tables maintained with aggregated data store 136, and corresponding elements of table schema data and corresponding delta tables. By way of example, as illustrated in FIG. 2A, executed ingestion may access source data table 142, including temporal partitions 142A, 142B, and 142C, and may also access table schema data 144 and delta table 146, which are associated with and characterize source data table 142. Based on delta table 146, executed ingestion engine may determine that temporal partitions 142A, 142B, and 142C of source data table 142 are associated with temporal intervals extending, respectively, from Feb. 1, 2022, to Feb. 28, 2022, from Mar. 1, 2022, to Mar. 31, 2022, and from Apr. 1, 2022, to Apr. 30, 2022, and further, that the temporal interval associated with the elements of source data 204, e.g., the temporal interval extending from May 1, 2022, to May 31, 2022, falls subsequent to the temporal intervals associated with temporal partitions 142A, 142B and 142C of source data table 142.

In some instances, executed ingestion engine 162 may perform operations that establish an additional temporal partition 208 of source data table 142, and generate, and store within delta table 146, elements of partition data 210 that identify newly established temporal partition 208 and specify the temporal interval associated with the newly established temporal partition 208, e.g., the temporal interval extending from May 1, 2022, to May 31, 2022. Newly established temporal partition 208 may include a plurality of customer-specific data records (e.g., customer-specific "rows" of source data table 142) capable of corresponding elements of internal source data 204A and external source data 204B disposed within columns consistent with the elements of table schema data 144. Executed ingestion engine 162 may, for example, parse the elements of table schema data 144, which identifies each of the columns maintained within temporal partition 208 of source data table 142 (e.g., via a column or field name), and associates each of the column names with a structure, format, or composition of corresponding ones of the elements of confidential or non-confidential data, and may perform operations that populate each of the customer-specific rows of temporal partition 208 with corresponding elements of internal source data 204A and external source data 204B in accordance with the elements of table schema data 144.

By way of example, and as illustrated in FIG. 2A, the plurality of customer-specific rows of temporal partition 208 may include, among other things, customer-specific row 212, and customer-specific row 212 may maintain a unique, alphanumeric customer identifier (e.g., "1011301") of a corresponding customer of the financial institution within column 214A (e.g., associated with column name "CUSTID"), an email address of the corresponding customer (e.g., "customer@example.com") within column 214B (e.g., associated with column name "EMAIL"), and a phone number of the corresponding customer (e.g., "1-202-555-1234") within column 214C (e.g., associated with column name "PHONE"). Further, customer-specific row 212 may also include an alphanumeric identifier of a financial product held by the corresponding customer (e.g., a sixteen-digit account number "1234-5678-9012-3456") and an outstanding balance associated with that financial product (e.g., "2,375.25") with respective ones of column 214D (e.g., associated with column name "ACCTID") and column 214E (e.g., associated with column name "BALANCE"). The disclosed embodiments are, however, not limited to these exemplary columns (or sequence of columns) and to these exemplary customer-specific rows, and in other instance, source data table 142, and additional, or alternate, ones of the source data tables maintained within aggregated data store 136, may include temporal partitions having any additional, or alternate, numbers of customer-specific rows that maintain data within any additional, or alternate, columns appropriate to the confidential and non-confidential customer data maintained within source systems 10 and accessed by executed ingestion engine 162.

Figure 2B:
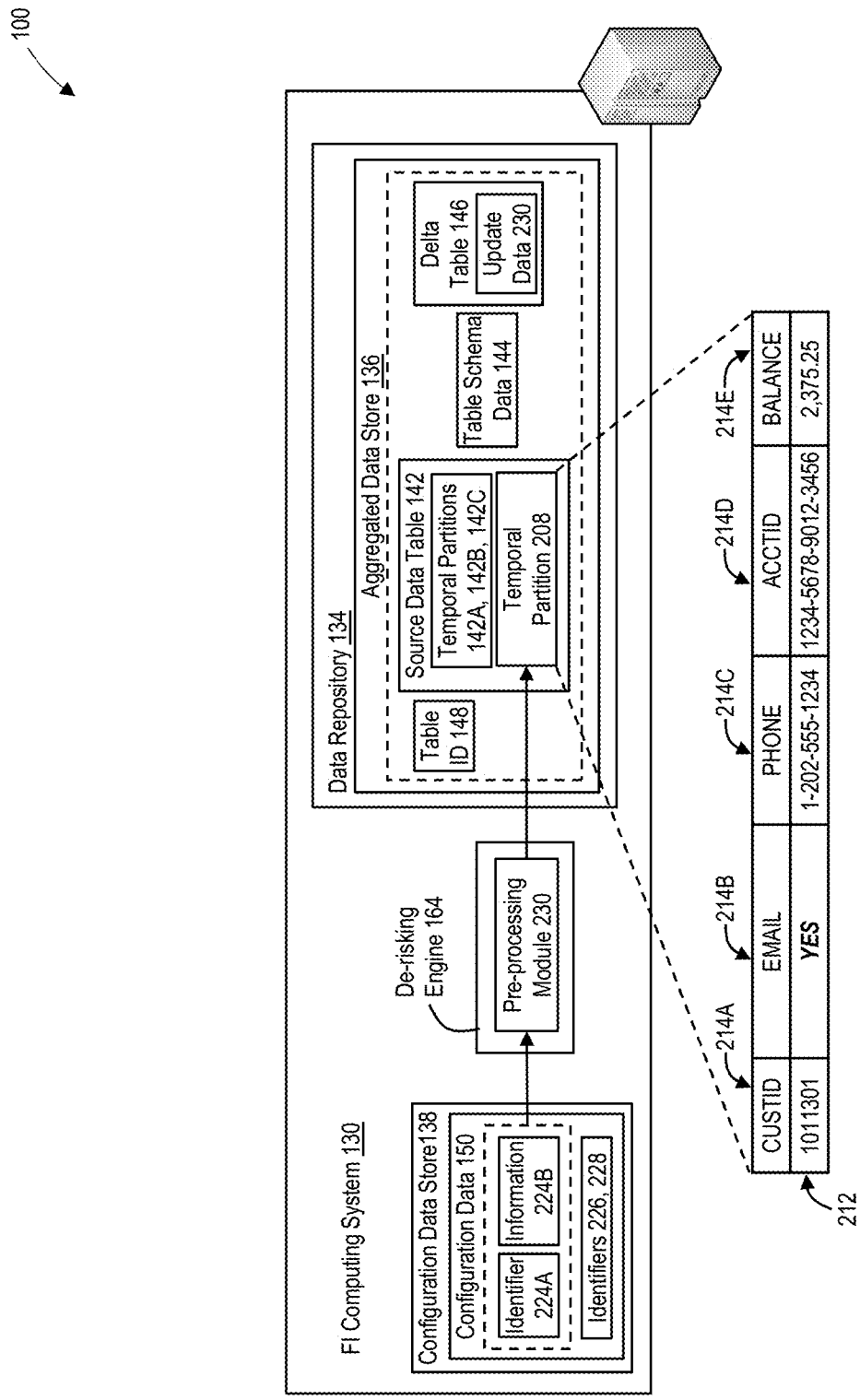

Referring to FIG. 2B, and upon execution by the one or more processors of FI computing system 130, executed de-risking engine 164 may perform operations that access configuration data store 138, and that access elements of configuration data associated with each of the source data tables maintained within aggregated data store 136, including source data table 142. As described herein, aggregated data store 136 may maintain source data table 142 in conjunction with a corresponding table identifier 148, and a pre-processing module 220 of executed de-risking engine 164 may obtain table identifier 148 associated with source data table 142 from aggregated data store 136, and may perform operations that obtain, from configuration data store 138, one or more elements of configuration data 150 associated with source data table 142.

In some instances, the elements of configuration data 150 may include, among other things, identifiers 224A of one or more columns or fields of source data table 142 that are subject to one or more of the exemplary pre-processing operations described herein (e.g., corresponding column names or field names consistent with the elements of table schema data 144, etc.), along with additional information 224B that identifies and characterizes the one or more pre-processing operations applicable to corresponding one of the columns of fields of source data table 142. The elements of configuration data 150 may also include identifiers 226 of one or more columns or fields of source data table 142 that are subject to one or more of the exemplary de-risking operations described herein (e.g., corresponding column names or field names consistent with the elements of table schema data 144, etc.), and identifiers 228 of one or more columns or fields of source data table 142 that are subject to exclusion from an output data table generated through an application of one or more join operations to source data table 142 and to other source data tables maintained within aggregated data store 136.

By way of example, identifiers 224A within the elements of configuration data 150 may specify that the customer-specific elements of confidential customer data maintained within column 214B of source data table 142 (e.g., the customer email addresses maintained within the column of source data table 142 associated with column name "EMAIL"), and additional information 224B may specify that these customer-specific elements are subject to a full redaction operation that replaces actual instances of an email address with the column with the character string "YES," and that replaces null values within the column with the character string "NO." Further, and by way of example, identifiers 226 within the elements of configuration data 150 may specify that the customer-specific elements of confidential customer data maintained within column 214C of source data table 142 (e.g., the customer phone numbers maintained within the column of source data table 142 associated with column name "PHONE") and within column 214D of source data table 142 (e.g., the alphanumeric identifier of a financial product held by the corresponding customer, as maintained within column 214D of source data table 142 and associated with column name "ACCTID") are subject to one or more of the de-risking operations prior to provisioning to any distributed data repository accessible across network 120, such as distributed data repository 180.

Referring back to FIG. 2B, executed pre-processing module 220 may perform operations that, based on table identifier 148, access aggregated data store 136 and obtain the elements of table schema data 144 and delta table 146 associated with source data table 142. As described herein, delta table 146 identify each of temporal partitions 142A, 142B, 142C, and 208 of source data table 142 and the temporal intervals associated with temporal partitions 142A, 142B, 142C, and 208 (e.g., the temporal intervals extending from Feb. 1, 2022, to Feb. 28, 2022, from Mar. 1, 2022, to Mar. 31, 2022, from Apr. 1, 2022, to Apr. 30, 2022, and from May 1, 2022, to May 31, 2022, respectively). Further, delta table 146 may also include data that identifies one or more prior preprocessing and/or de-risking applied to one or more of temporal partitions 142A, 142B, 142C, and 208, and specifies that one or more of temporal partitions 142A, 142B, and 142C awaiting preprocessing and/or de-risking, using any of the exemplary processes described herein.

By way of example, executed pre-processing module 220 may parse delta table 146, and may determine that the elements of confidential customer data maintained within temporal partitions 142A, 142B, and 142C of source data table 142 were previously pre-processed in accordance with the one or more elements of configuration data 150 associated with source data table 142, and that one or more of the exemplary de-risking processes described herein were previously applied (e.g., by executed de-risking engine 164) to the elements of confidential customer data maintained within those columns of source data table 142 associated with each of identifiers 226 included within the elements of configuration data 150. Further, and based on delta table 146, executed pre-processing module 220 may determine that the elements of confidential customer data maintained within temporal partition 208 of source data table 142 await pre-processing, and additionally, an application of one or more of the exemplary de-risking operations described herein, in accordance with the one or more elements of configuration data 150.

In some instances, executed pro-processing module 220 may access identifiers 224A and additional information 224B, and may determine that the customer-specific elements of confidential customer data maintained within column 214B of temporal partition 208 (e.g., the customer email addresses maintained within the column of source data table 142 associated with column name "EMAIL") are subject to a full redaction operation that replaces actual instances of a customer email address with column 214B with the character string "YES," and that replaces null values within column 214B with the character string "NO." Executed pre-processing module 220 may also access the rows of source data table 142 disposed within temporal partition 208, and may perform operations that apply the full redaction operations against the customer email addresses, or alternatively, the null values disposed within column 214B (e.g., having the column name "EMAIL") of each of the accessed rows.

For example, as illustrated in FIG. 2B, customer-specific row 212 of temporal partition 208 may maintain, within column 214B (e.g., column name "EMAIL") an actual instance of a customer email (e.g., "customer @example-.com") of the customer of the financial institution associated with alphanumeric customer identifier "1011301." In some instances, executed pro-processing module 220 may access the customer email address maintained within row 212 at column 214B (e.g., "customer@example.com"), and may perform operations that apply the full-redaction operation to the customer email address, and replace the actual instance "customer@example.com" with the character string "YES." Executed pre-processing module 220 may perform similar operations to apply the full-redaction operation to the actual instance of the customer email address, or the null value, maintained within column 214B of each additional row of temporal partition 208, and may store the pre-processed elements of data within corresponding portions of source data table 142 in aggregated data store 136.

Further, as illustrated in FIG. 2B, executed pre-processing module 220 may generate one or more elements of update data 230 that indicate the application of the full-redaction operations to the elements of confidential customer data maintained at column 214B of the rows of partition 208, and perform operations that augment delta table 146 to include the elements of update data 230, e.g., to update delta table 146 to reflect the application of the pre-processing operations those columns of temporal partition 208 in accordance with the elements of configuration data 150 associated with source data table 142. In some instances, not illustrated in FIG. 2B, executed pre-processing module 220 may perform any of the exemplary pre-processing operations described herein to apply a full-, or partial-redaction operation to one or more elements of confidential and non-confidential data maintained in rows of temporal partitions of one or more additional, or alternate, ones of the source data tables within aggregated data store 136, e.g., based on corresponding elements of configuration data associated with the source data tables.

Further, in some instances, executed de-risking engine 164 may also perform one or more of the exemplary de-risking operations described herein to tokenize reversibly elements of confidential customer data maintained within one or more columns of source data table 142 across multiple temporal partitions, and elements of confidential customer data maintained within one or more columns of additional, or alternate, source data tables across corresponding temporal partitions. Through an implementation of one or more of these exemplary de-risking operations, executed de-risking engine 164 may obfuscate a commonly formatted, structured, or composed value of a particular element of confidential customer data, or differently formatted, structured, or composed values of the particular element of confidential customer data, maintained within columns of source data table 142 and the additional, or alternate, source data tables of aggregated data store using a common digital token, which may preserve a referential integrity of these columns across the source data tables during SQL-based join operations.

Figure 3A:
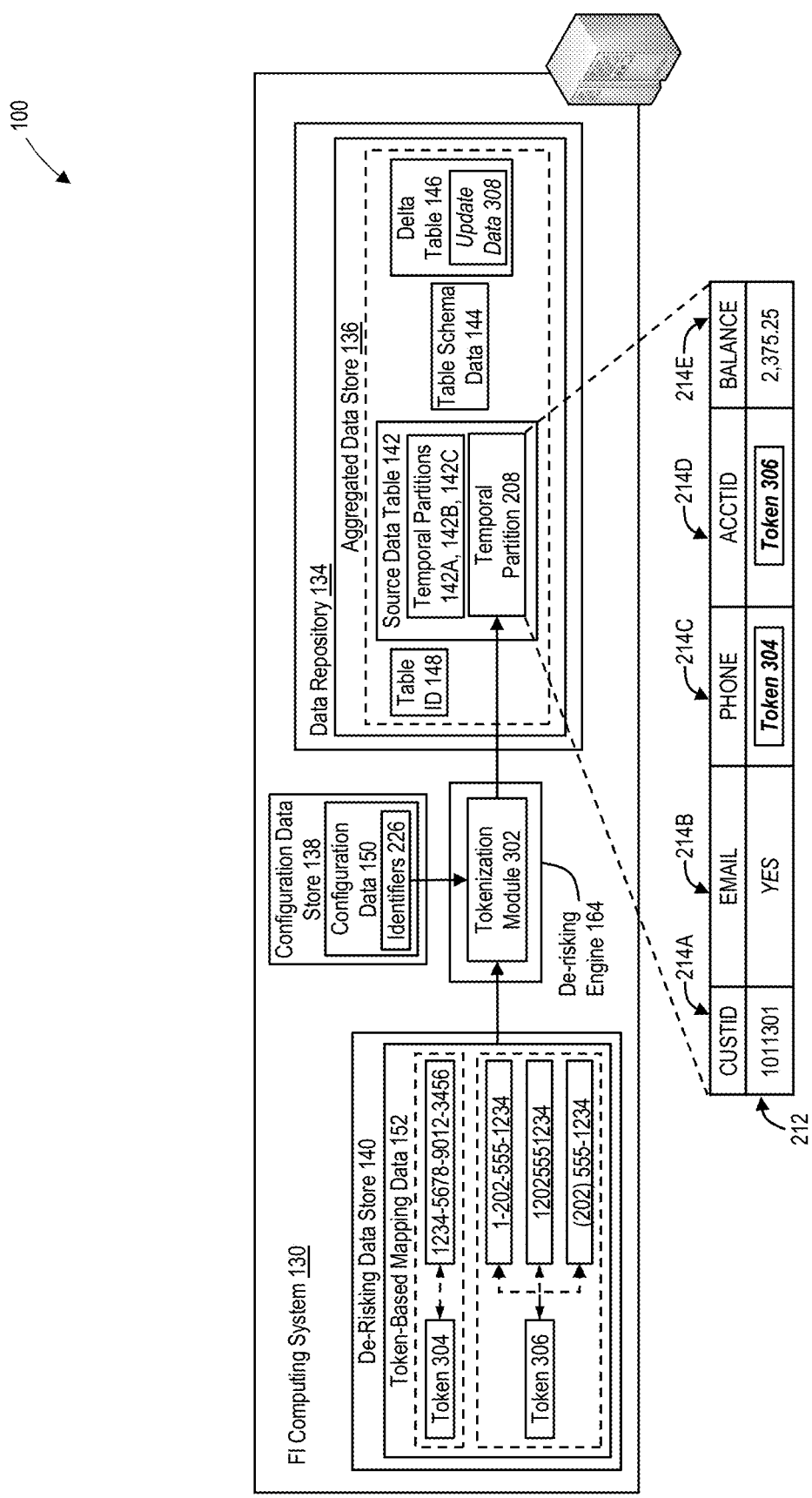

Referring to FIG. 3A, a tokenization module 302 of executed de-risking engine 164 may perform operations that access configuration data store 138, and that access elements of configuration data associated with each of the source data tables maintained within aggregated data store 136, including source data table 142. In some instances, aggregated data store 136 may maintain source data table 142 in conjunction with a corresponding table identifier 148, and executed tokenization module 302 may obtain table identifier 148 associated with source data table 142 from aggregated data store 136, and may perform operations that obtain, from configuration data store 138, one or more elements of configuration data 150 associated with source data table 142.

As described herein, the elements of configuration data 150 may include, among other things, identifiers 226 of one or more columns or fields of source data table 142 that are subject to one or more of the exemplary de-risking operations described herein (e.g., corresponding column names or field names consistent with the elements of table schema data 144, etc.), By way of example, identifiers 226 within the elements of configuration data 150 may specify that the customer-specific elements of confidential customer data maintained within column 214C of source data table 142 (e.g., the customer phone numbers maintained within the column of source data table 142 associated with column name "PHONE") and within column 214D of source data table 142 (e.g., the alphanumeric identifier of a financial product held by the corresponding customer, as maintained within the column of source data table 142 and associated with column name "ACCTID") are subject to one or more of the de-risking operations prior to provisioning to any distributed data repository accessible across network 120, such as distributed data repository 180.

Referring back to FIG. 3A, executed tokenization module 302 may perform operations that, based on table identifier 148, access aggregated data store 136 and obtain the elements of table schema data 144 and delta table 146 associated with source data table 142. As described herein, delta table 146 identify each of temporal partitions 142A, 142B, 142C, and 208 of source data table 142 and the temporal intervals associated with temporal partitions 142A, 142B, 142C, and 208 (e.g., the temporal intervals extending from Feb. 1, 2022, to Feb. 28, 2022, from Mar. 1, 2022, to Mar. 31, 2022, from Apr. 1, 2022, to Apr. 30, 2022, and from May 1, 2022, to May 31, 2022, respectively). Further, delta table 146 may also include data that identifies one or more prior preprocessing and/or de-risking applied to one or more of temporal partitions 142A, 142B, 142C, and 208, and specifies that one or more of temporal partitions 142A, 142B, and 142C awaiting preprocessing and/or de-risking, using any of the exemplary processes described herein.

By way of example, executed tokenization module 302 may parse delta table 146, and may determine that the elements of confidential customer data maintained within temporal partitions 142A, 142B, 142C, and 208 of source data table 142 were previously pre-processed in accordance with the one or more elements of configuration data 150 associated with source data table 142, and that one or more of the exemplary de-risking processes described herein were previously applied (e.g., by executed de-risking engine 164) to the elements of confidential customer data maintained within those columns of source data table 142 associated with each of identifiers 226 included within the elements of elements of configuration data 150. Further, and based on delta table 146, executed pre-processing module 220 may determine that the elements of confidential customer data maintained within temporal partition 208 of source data table 142 await an application of one or more of the exemplary de-risking operations described herein, such as, but not limited token, one or more of the exemplary tokenization operations that maintain referential integrity, in accordance with the one or more elements of configuration data 150.

In some instances, to facilitate the reversible tokenization of the elements of confidential customer data maintained within columns 214C and 214D of temporal partition 208 of source data table 142 (e.g., the customer-specific phone numbers and account identifier, as described herein), executed tokenization module 302 may access de-risking data store 140 maintained within data repository 134, and may obtain one or more elements of token-based mapping data 152. As described herein, the source data tables of aggregated data store 136 (including source data table 142) may maintain, within corresponding columns, an elements of confidential customer data in a common format, structure, or composition, and the elements of token-based mapping data 152 may associate that element of the confidential customer data with a corresponding, and unique, digital token that obfuscates the elements of confidential customer data across the columns of the source data tables maintained within aggregated data store 136.

Additionally, the source data tables of aggregated data store 136 (including source data table 142) may also maintain a plurality of distinct, but contextually consistent, elements of confidential customer data in a variety of distinct formats, structures or compositions. In some instances, the elements of token-based mapping data 152 may associate each of the distinct, but contextually consistent, elements of the confidential customer data within the source data tables maintained within aggregated data store 136 with a corresponding, and unique, digital token, which may obfuscate each of the distinct, but contextually consistent, elements of confidential customer data across the columns of the source data tables maintained within aggregated data store 136. As described herein, each of these additional digital tokens may include a corresponding, and distinct, randomly generated alphanumeric character string having a predetermined length (e.g., thirty-two characters) which may reduce occurrences of collisions between corresponding ones of the digital tokens and the tokenized elements of confidential customer data.

As described herein, certain of these exemplary tokenization processes may maintain referential integrity between the columns of the source data tables maintained within aggregated data store 136, while obscuring the corresponding elements of confidential customer data, and may facilitate customized, SQL-based join operations across one or more of the source data tables maintained within aggregated data store 136 (e.g., within multiple, distinct database). Further, by maintaining a single data structure that facilitates a reversible tokenization of columns of data across multiple source data tables (e.g., token-based mapping data 152), certain of these exemplary tokenization processes may reduce a number of tables needed for tokenization and de-risking, when compared to many conventional tokenization processes that associate each of the multiple source data tables with a corresponding tokenization table that fails to maintain referential integrity across the tokenized source tables.

Referring to FIG. 3A, and based on identifiers 226 maintained within the elements of configuration data 150, executed tokenization module 302 may establish that the elements of confidential customer data maintained within column 214C of source data table 142 (e.g., the customer phone numbers maintained within the column associated with column name "PHONE") and within column 214D of source data table 142 (e.g., the alphanumeric identifier of the financial product maintained within the column of and associated with column name "ACCTID") are subject to one or more tokenization operations consistent with the elements of token-based mapping data 152. Further, and based on portions of delta table 146, executed tokenization module 302 may also establish that the rows maintained within temporal partition 208 (e.g., associated with the temporal interval spanning May 1, 2022, to May 31, 2022) include elements of confidential customer data that await tokenization consistent with the elements of token-based mapping data 152.

In some instances, executed tokenization module 302 may also access the rows of source data table 142 disposed within temporal partition 208, and may perform operations that, for each of the accessed rows, replace the customer phone number (e.g., maintained within column 214C associated with column name "PHONE") with a corresponding, unique digital token specified within the elements of token-based mapping data 152, and replace the account identifier (e.g., maintained within column 214D associated with column name "ACCTID") with an additional, unique digital token specified within the elements of token-based mapping data 152. By way of example, and as illustrated in FIG. 3A, executed tokenization module 302 may access row 212 of partition 208, and obtain the customer phone number (e.g., "1-202-555-1234") from column 214C and the alphanumeric identifier of the financial product (e.g., the sixteen-digit account number "1234567890123456") from column 214D.

Further, executed tokenization module 302 may parse the one or more elements of token-based mapping data 152 and determine that the sixteen-digit account number "1234-5678-9012-3456," as obtained from column 214D of row 212 within partition 208, is associated with a corresponding, unique digital token 304. As described herein, digital token 304 may correspond to a randomly generated alphanumeric character string having a predetermined length (e.g., thirty-two characters), which may uniquely represent the sixteen-digit account number "1234-5678-9012-3456" across the columns of source data table 142 and the one or more additional, or alternate, source data tables maintained within aggregated data store 136. As illustrated in FIG. 3A, executed tokenization module 302 may perform operations that tokenize, reversibly, the sixteen-digit account number "1234-5678-9012-3456" maintained within row 212 by replacing the sixteen-digit account number "1234-5678-9012-3456" with digital token 304, e.g., the randomly generated, thirty-two character alphanumeric character string.

Executed tokenization module 302 may parse the one or more elements of token-based mapping data 152 and determine that the customer phone number "1-202-555-1234," as obtained from column 214C of row 212 within partition 208, represents one of a plurality of distinct, but contextually consistent, representations of the customer phone number of that customer of the financial institution associated with customer identifier "1011301." By way of example, and based on the elements of token-based mapping data 152, executed tokenization module 302 may establish that, across the columns of source data table 142 and the additional, or alternate, source data tables maintained within aggregated data store 136, the distributed components of FI computing system 130 maintain the phone number of the customer associated with customer identifier "1011301," in formats, structures, or compositions that include, but are not limited to, "1-202-555-1234" (e.g., as maintained within row 212 of temporal partition 208 of source data table 142), "12025551234," and "(202) 555-1234."

Further, executed tokenization module 302 may parse the elements of token-based mapping data 152 and determine that each of the distinct formats, structures, or compositions of the customer phone number (including the obtained "1-202-555-1234") may be associated with a common, and unique, digital token 306. As described herein, digital token 306 may correspond to a randomly generated alphanumeric character string having a predetermined length (e.g., thirty-two characters), which may uniquely represent the sixteen-digit account number "1234-5678-9012-3456" across the columns of source data table 142 and the one or more additional, or alternate, source data tables maintained within aggregated data store 136. In some instances, illustrated in FIG. 3A, executed tokenization module 302 may perform operations that tokenize, reversibly, the customer telephone number "1-202-555-1234" maintained within row 212 by replacing the customer telephone number "1-202-555-1234" with digital token 306, e.g., the randomly generated, thirty-two character alphanumeric character string.

In some instances, not illustrated in FIG. 3A, the elements of token-based mapping data 152 may fail to map a particular element of confidential customer data maintained within the rows of temporal partition 208, and subject to reversible tokenization in accordance with the elements of configuration data 150 (e.g., one or more the customer phone numbers or customer account identifiers maintained in columns 214C or 214D of row 212) to a corresponding one of the unique digital tokens. Based on the failure of the elements of token-based mapping data 152 to fail to map the element of confidential customer data to the corresponding, unique digital token, executed tokenization module 302 may perform operations (not illustrated in FIG. 3A) that obtain elements of process data characterizing a token-generation process associated with the elements of token-based mapping data 152. Executed tokenization module 302 may, for example, apply the token-generation process to at least a portion of the particular element of confidential customer data (e.g., the customer phone number or the account identifier, etc.), and based on the application of the token-generation process to at least the portion of the particular element of confidential customer data, executed tokenization module 302 may generate a randomly generated alphanumeric character string having the predetermined length or structure (e.g., thirty-two characters).

The randomly generated alphanumeric character string may correspond to a unique digital token that obfuscates the particular element of confidential customer data across the columns of the source data tables maintained within aggregated data store 136 (e.g., while maintaining referential integrity), and executed tokenization module 302 may perform operations that modify the elements of token-based mapping data 152 to include additional information that associates with element of confidential data with the newly generated, and unique, digital token, e.g., the randomly generated alphanumeric character string having the predetermined length or structure. Further, executed tokenization module 302 may also perform any of the exemplary processes described herein to tokenize the particular element of confidential customer data within the rows of partition 208 of source data table 142 using the newly generated, and unique, digital token, e.g., by replacing the particular element of confidential customer data within the rows of partition 208 with the newly generated, and unique, digital token.

Executed tokenization module 302 may perform similar operations to tokenize the customer phone numbers and the account identifiers maintained within each additional, or alternate row (e.g., within respective ones of columns 214C and 214D) of temporal partition 208 of source data table 142, and may store the tokenized elements of confidential customer data within corresponding portions of source data table 142 in aggregated data store 136. Further, upon tokenization of the elements of confidential customer data maintained in columns 214C and 214D of each row within temporal partition 208 of source data table 142, executed pre-processing module 220 may generate one or more elements of update data 308 that confirms a completion of the tokenization of the elements of confidential customer data maintained columns 214C and 214D within the rows of partition 208, and perform operations that augment delta table 146 to include the elements of update data 308, e.g., to update delta table 146 to reflect the completion on the tokenization of the confidential customer data maintained within the columns of temporal partition 208 in accordance with the elements of configuration data 150 associated with source data table 142.

Further, although not illustrated in FIG. 3A, executed tokenization module 302 may also perform any of the exemplary processes described herein to obtain a table identifier and delta table associated with each of the additional source data tables maintained within aggregated data store 136. Based on the table identifiers, executed tokenization module 302 may also perform any of the exemplary processes described herein to access configuration data store 138 and obtain one or more elements of configuration data associated with each of the additional source data tables, and to obtain, for each of the additional source data tables, data identifying one or more columns maintaining elements of confidential data that are subject to one or more tokenization operations consistent with the elements of token-based mapping data 152, such as, but not limited to, column or filed names associated with the customer phone numbers or the account identifiers within corresponding ones of the additional source data tables. Executed tokenization module 302 may also parse the delta table associated with each of the additional source data tables, and perform any of the exemplary processes described herein to identify one, or more, temporal partitions of each of the additional source data files that await tokenization consistent with the elements of token-based mapping data 152.

For each of the additional source data tables within aggregated data store, executed tokenization module 302 may perform any of the exemplary processes described herein to replace the elements of confidential data within the rows of corresponding ones of the temporal partitions with a corresponding one of the unique tokens maintained within the elements of token-based mapping data 152, and to store the tokenized elements of confidential customer data within portions of corresponding ones of the additional source data tables, e.g., within aggregated data store 136. Further, upon tokenization of the elements of confidential customer data maintained within one, or more, of the additional source data tables, executed tokenization module 302 may perform any of the exemplary processes described herein to update corresponding ones delta table to reflect a completion of the tokenization of the elements of confidential customer data maintained within corresponding ones of the additional source data tables.

Through an implementation of one or more of these exemplary processes described herein, executed tokenization module 302 may obfuscate a commonly formatted, structured, or composed value of a particular element of confidential customer data, or differently formatted, structured, or composed values of the particular element of confidential customer data, maintained within columns of source data table 142 and the additional, or alternate, source data tables of aggregated data store 136 using a common digital token, which may preserve a referential integrity of these columns across the source data tables during SQL-based join operations. Further, in some instances, and prior to provisioning the now-tokenized source data tables to one or more distributed data repositories accessible to computing systems and devices across network 120, such as distributed data repository 180, executed de-risking engine 164 may perform further operations that implement selectively one or more SQL-based operations (e.g., one or more SQL-based join operations) involving each, or a selected subset of, the tokenized source data tables maintained within aggregated data store, either alone or in conjunction with one or more table-specific exclusion operations specified within corresponding elements of configuration data maintained within configuration data store 138. Based on the selective implementation of the one or more SQL-based operations and/or the table-specific exclusion operations, executed de-risking engine 164 may generate a tokenized data table (e.g., tokenized data table 310 of FIG. 3B), which the distributed components of FI computing system 130 may provision to distributed data repository 180.

Figure 3B:
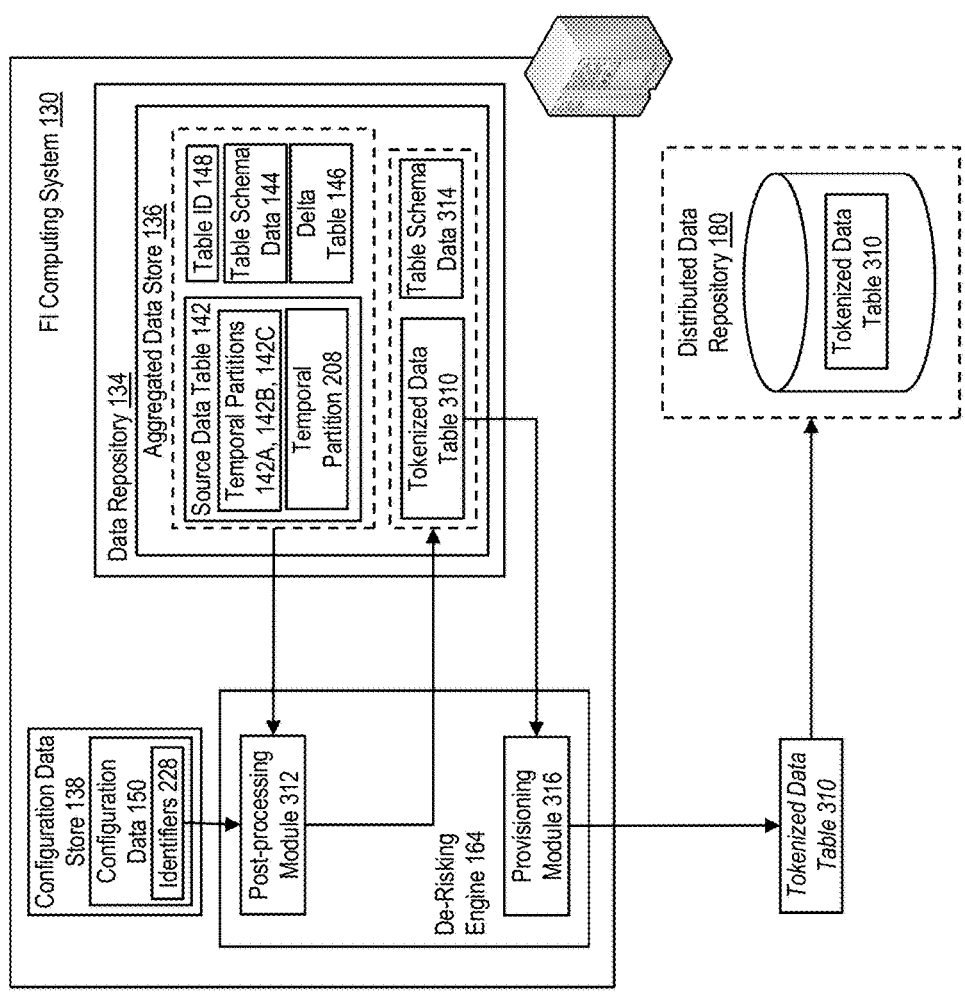

Referring FIG. 3B, a post-processing module 312 of executed de-risking engine 164 may access one or more of the tokenized source data tables maintained within aggregated data store (including tokenized source data table 142), and obtain corresponding elements of table schema data and corresponding table identifiers associated with each of the accessed, tokenized source data tables. Executed post-processing module 312 may also perform operations that access configuration data store 138, and based on each of the table identifiers, access elements of configuration data associated with corresponding ones of the tokenized source data tables. Each of the elements of configuration data may identify one or more columns or fields of the corresponding tokenized source data table that are subject to one or more of the exemplary tokenization operations described herein, and in some instances, one or more of the elements of configuration data may identify one or more columns or fields of the corresponding tokenized source data table that ae subject to exclusion from tokenized data table 310.

For example, executed post-processing module 312 may obtain, from aggregated data store 136, table identifier 148 associated with tokenized source data table 142 and elements of table schema data 144. Further, executed post-processing module 312 may also obtain one or more elements of configuration data 150 associated with tokenized source data table 142, and as described herein, the elements of configuration data 150 may include, among other things, identifiers 226 of the one or more columns or fields of tokenized source data table 142 that are subject to one or more of the exemplary tokenization operations described herein (e.g., corresponding column names or field names consistent with the elements of table schema data 144, such as the column names "PHONE" and "ACCTID" associated with columns 214C and 214D, etc.), and identifiers 228 of one or more columns or fields of tokenized source data table 142 that are subject to exclusion from tokenized data table 310, which may be generated through an application of one or more SQL-based join operations to tokenized source data table 142 and to one or more of the other tokenized source data tables maintained within aggregated data store 136.

Based on the elements of configuration data associated with each of the tokenized data tables (including the elements of configuration data 150 associated with tokenized source data table 142), and based on the elements of table schema data identifying the columns maintained within each of the tokenized data tables (including the elements of table schema data 144 associated with tokenized source data table 142), executed post-processing module 312 may perform operations that implement selectively the one or more SQL-based join operations involving corresponding ones of the columns of the tokenized source data tables (e.g., as identified the table-specific elements of the configuration data, such as the column or field names specified by identifiers 226 of the elements of configuration data 150 associated with tokenized source data table 142). Further, concurrently with, or prior to, the selective implementation of the one or more SQL-based join operations involving the corresponding columns of the tokenized source data tables, executed post-processing module 312 may also implement one or more exclusion operations that exclude columns from one or more of the tokenized source data tables from the selective implementation of the SQL-based join operations (e.g., as identified the table-specific elements of the configuration data, such as the column or field names specified by identifiers 228 of the elements of configuration data 150 associated with tokenized source data table 142).

Further, based on the selective implementation of the one or more SQL-based join operations involving the corresponding columns of the tokenized source data tables and in some instances, based on the selective implementation of the one or more exclusion operations described herein, executed post-processing module 312 may generate tokenized data table 310 that includes the selectively joined columns of the tokenized source data table, and may store tokenized data table 310 within a corresponding portion of aggregated data store 136. In some instances, executed post-processing module 312 may also perform operations that generate, and store in associated with tokenized data table 310 within aggregated data store 136, one or more elements of table schema data 314, which identifies each of the columns maintained within the tokenized data table 310 (e.g., via a column name or field name) and that associates one or more of the column or field names within a structure, format, or composition of corresponding data elements.

In some instances, a provisioning module 316 of executed de-risking engine 164 may perform operations that obtain tokenized data table 310 from aggregated data store 136, and that cause the FI computing system 130 to transmit tokenized data table 310 across network 120 to one or more computing systems that establish and maintain distributed data repository 180, which may accessible to distributed modelling system 170 across network 120 (and additionally, alternatively, to transmit tokenized data table 310 to distributed modelling system 170 directly across network 120). These computing components (not illustrated in FIG. 3A) may receive tokenized data table 310, and may perform operations that store tokenized data table 310 within a portion of distributed data repository 180. In some instances, distributed data repository 180 may be associated with one or more machine-learning or artificial-intelligence processes trained adaptively and validated by one or more distributed computing components, such as, but not limited to, distributed modelling system 170.

By way of example, the components of distributed modelling system 170 may perform operations that access tokenized data table 310 (e.g., as maintained within distributed data repository 180, and may perform additional operations (e.g., extract, transform, and load (ETL) operations, etc.) that generate customer-specific feature vectors suitable for ingestion by the one or more machine-learning or artificial-intelligence processes, e.g., during an adaptive training and validation phase, or during a subsequent inferencing phase involving one or more of the adaptively trained machine-learning or artificial-intelligence processes. A successful training and validation of these machine-learning or artificial-intelligence processes, and their subsequent successful deployment, may depend on, among other things, a consistency of data types (e.g., format, structure, or composition) between elements of data maintained within the feature vectors ingested by the machine-learning or artificial-intelligence processes during the discrete training, validation, and inferencing phases, along with an ability to generate feature vectors characterized by a composition that satisfies one or more composition-specific, statistical benchmarks during the discrete training, validation, and inferencing phases.

Although the exemplary tokenization processes described herein may obfuscate elements of confidential customer data within the columns of the source data tables maintained by the distributed components of FI computing system 130, and within the columns of the tokenized data tables provisioned to distributed data repository 180, while maintaining referential integrity between these columns, these exemplary tokenization processes may be incapable of generating digital tokens (e.g., the randomly generated character string of predetermined length, as described herein) that obfuscate actual elements of confidential customer data within these source and tokenized data tables and that maintain a format, structure, or composition (e.g., a "data type") of corresponding ones of the actual elements of confidential customer data. By way of example, the computing components of distributed modelling system 170 may generate feature vectors based on an application of one or more ETL operations to, among other things, the tokenized customer data maintained within tokenized table data 310. Although the computing components of distributed modelling system 170 may perform operations that train and validate the one or more machine-learning or artificial-intelligence processes based on generated feature vectors that include tokenized customer data, these trained machine-learning or artificial-intelligence processes may fail to generate output data having an expected structure, format, or composition with application to actual elements of confidential customer data.

Further, in some examples, due to an inclusion of tokenized customer data within the elements of tokenized table data 310, the computing components of distributed modelling system may be incapable of generating feature vectors having a composition that satisfies one or more composition-specific, statistical benchmarks during the discrete training, validation, and inferencing phases. In some examples, described herein, executed de-risking engine 164 may perform operations that anonymize selectively elements of confidential customer data maintained within the columns of one or more of the source data tables of aggregated data store 136, such as source data table 142, by replacing all, or a selected subset, of the elements of confidential customer data these columns with randomly generated data that maintains a format, structure, or a composition (e.g., a "data type") of corresponding ones of the elements of confidential customer data, e.g., as specified within the table schemas associated with the source data tables.

By replacing the actual elements of confidential customer data within corresponding columns of the one or more source data tables with selectively anonymized, type-preserving data elements, certain of these exemplary processes may obfuscate the actual elements of confidential customer data while maintaining a referential integrity of the columns of the source data tables during not only a performance of one or more of the exemplary anonymization processes described herein, but also during an implementation of one or more SQL-based join operations involving these source data tables. Further, through a replacement of the actual elements of confidential customer data within corresponding columns of the one or more source data tables with selectively anonymized, type-preserving data elements, certain of these exemplary processes may also may enable the computing components of distributed modelling system 170 to process selectively anonymized customer data that maintains a format, structure, or composition of responsive ones of the actual elements of confidential customer data, and generate corresponding feature vectors that satisfy the one or more composition-specific, statistical benchmarks and that are suitable for ingestion by the machine-learning or artificial-intelligence processes during training, validation, and inferencing phases.

Figure 3C:
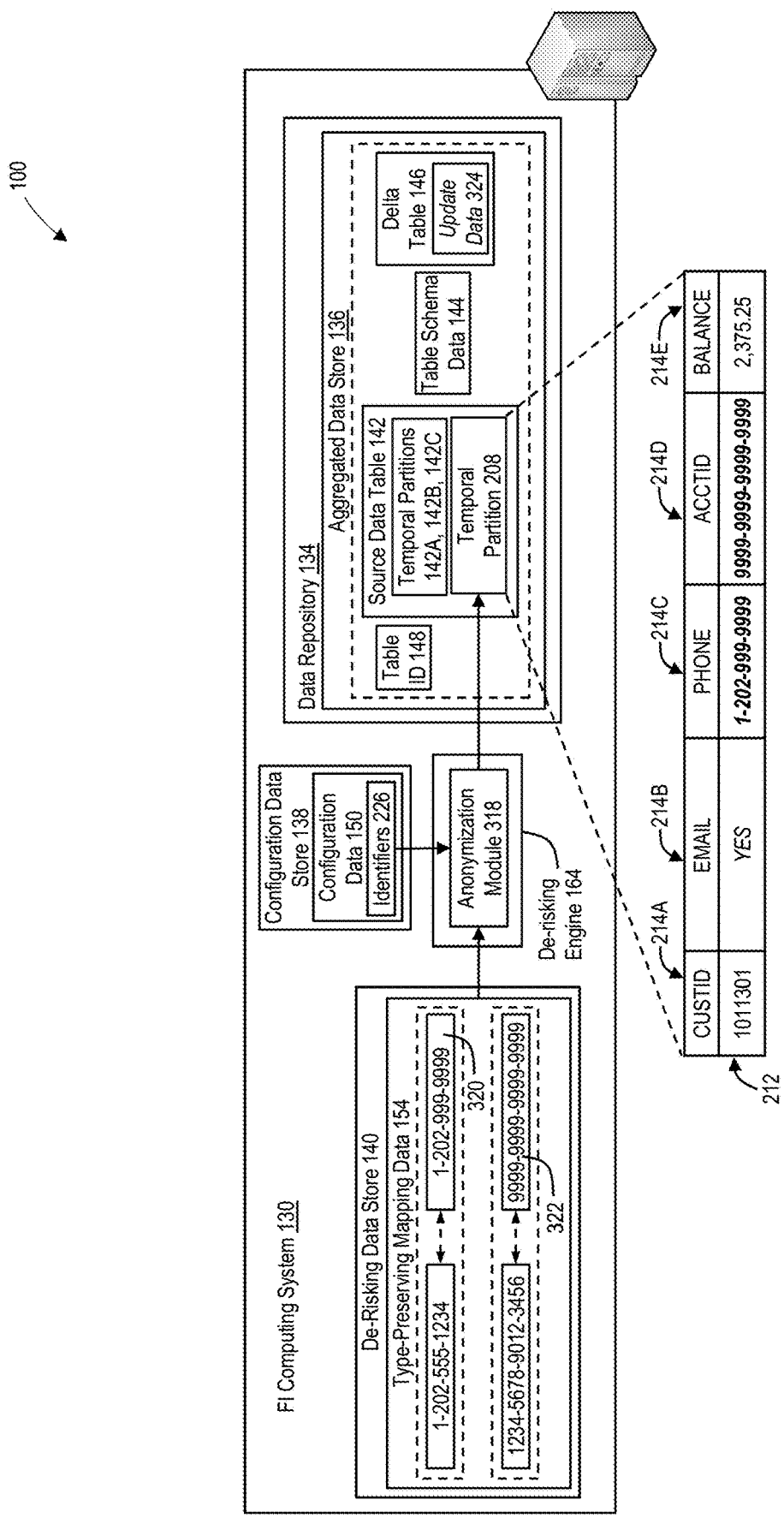

Referring to FIG. 3C, an anonymization module 318 of executed de-risking engine 164 may perform operations that access configuration data store 138, and that access elements of configuration data associated with each of the source data tables maintained within aggregated data store 136, including source data table 142. For example, aggregated data store 136 may maintain source data table 142 in conjunction with a corresponding table identifier 148, and executed anonymization module 318 may obtain table identifier 148 associated with source data table 142 from aggregated data store 136, and may perform operations that obtain, from configuration data store 138, the elements of configuration data 150 associated with source data table 142.

The elements of configuration data 150 may include, among other things, identifiers 226 of one or more columns or fields of source data table 142 that are subject to one or more of the exemplary de-risking operations described herein (e.g., corresponding column names or field names consistent with the elements of table schema data 144, etc.), and as described herein, identifiers 226 may specify that the customer-specific elements of confidential customer data maintained within column 214C of source data table 142 (e.g., the customer phone numbers maintained within the column of source data table 142 associated with column name "PHONE") and within column 214D of source data table 142 (e.g., the alphanumeric identifier of a financial product held by the corresponding customer, as maintained within the column of source data table 142 and associated with column name "ACCTID") are subject to one or more of the de-risking operations prior to provisioning to any distributed data repository accessible across network 120, such as distributed data repository 180.

Referring back to FIG. 3C, executed anonymization module 318 may perform operations that, based on table identifier 148, access aggregated data store 136 and obtain the elements of table schema data 144 and delta table 146 associated with source data table 142. As described herein, delta table 146 identify each of temporal partitions 142A, 142B, 142C, and 208 of source data table 142 and the temporal intervals associated with temporal partitions 142A, 142B, 142C, and 208 (e.g., the temporal intervals extending from Feb. 1, 2022, to Feb. 28, 2022, from Mar. 1, 2022, to Mar. 31, 2022, from Apr. 1, 2022, to Apr. 30, 2022, and from May 1, 2022, to May 31, 2022, respectively). Further, delta table 146 may also include data that identifies one or more prior preprocessing and/or de-risking applied to one or more of temporal partitions 142A, 142B, 142C, and 208, and specifies that one or more of temporal partitions 142A, 142B, and 142C awaiting preprocessing and/or de-risking, using any of the exemplary processes described herein.

By way of example, executed anonymization module 318 may parse delta table 146, and may determine that the elements of confidential customer data maintained within temporal partitions 142A, 142B, 142C, and 208 of source data table 142 were previously pre-processed in accordance with the one or more elements of configuration data 150 associated with source data table 142, and that one or more of the exemplary de-risking processes described herein were previously applied (e.g., by executed de-risking engine 164) to the elements of confidential customer data maintained within those columns of temporal partitions 142A, 142B, 142C, and 208 of source data table 142 associated with each of identifiers 226. Further, and based on delta table 146, executed anonymization module 318 may determine that the elements of confidential customer data maintained within temporal partition 208 of source data table 142 await an application of one or more of the exemplary de-risking operations described herein.

In some instances, to facilitate the anonymization of the elements of confidential customer data maintained within columns 214C and 214D of temporal partition 208 of source data table 142 (e.g., the customer-specific phone numbers and account identifier, as described herein), executed anonymization module 318 may access de-risking data store 140 maintained within data repository 134, and may obtain one or more elements of type-preserving mapping data 154. As described herein, the elements of type-preserving mapping data 154 may associate actual elements of confidential customer data, which may be maintained within columns 214C, column 214D, and other columns of the source data tables in table-specific formats, structures, or compositions, with elements of fully, or partially anonymized data that maintain the table-specific formats, structures, or compositions characterizing corresponding ones of the actual elements of confidential customer data (e.g., elements of "type-preserving" anonymized data that a preserve a "data type" associated with the corresponding ones of the actual elements of confidential customer data).

In some instances, by associating the actual elements of confidential customer data maintained within the columns of the source data tables with elements of fully, or partially, anonymized data that preserve the data type of the corresponding actual elements of confidential customer data, the one or more elements of type-preserving mapping data 154 enable the distributed components of FI computing system 130 to maintain a referential integrity of the columns of the source data tables maintained within aggregated data store 136 during not only a performance of one or more of the exemplary de-risking processes described herein, but also during an implementation of one or more SQL-based join operations involving these source data tables.

Referring back to FIG. 3C, and based on identifiers 226 maintained within the elements of configuration data 150, executed anonymization module 318 may establish that the elements of confidential customer data maintained within column 214C of source data table 142 (e.g., the customer phone numbers maintained within the column associated with column name "PHONE") and within column 214D of source data table 142 (e.g., the alphanumeric identifier of the financial product maintained within the column of and associated with column name "ACCTID") are subject to one or more tokenization operations consistent with the elements of token-based mapping data 152. Further, and based on portions of delta table 146, executed anonymization module 318 may also establish that the rows maintained within temporal partition 208 (e.g., associated with the temporal interval spanning May 1, 2022, to May 31, 2022) include elements of confidential customer data that await tokenization consistent with the elements of token-based mapping data 152.

In some instances, executed anonymization module 318 may also access the rows of source data table 142 disposed within temporal partition 208, and may perform operations that, for each of the accessed rows, replace the customer phone number (e.g., maintained within column 214C associated with column name "PHONE") with a corresponding, type-preserving element of fully or partially anonymized data specified within the elements of type-preserving mapping data 154 that masks fully the actual customer phone number while maintaining the table-specific format, structure, or composition of the actual customer phone number. Executed anonymization module 318 may also perform operations that, for each of the accessed rows, replace the actual account identifier (e.g., maintained within column 214D associated with column name "ACCTID") with a corresponding, type-preserving element of fully or partially anonymized data specified within the elements of type-preserving mapping data 154 that masks fully the actual account identifier while maintaining the table-specific format, structure, or composition of the actual account identifier number.

By way of example, and as illustrated in FIG. 3A, executed anonymization module 318 may access row 212 of partition 208 of source data table 142, and may obtain the customer phone number (e.g., "1-202-555-1234") from column 214C and the alphanumeric identifier of the financial product (e.g., the sixteen-digit account number "1234-5678-9012-3456") from column 214D. Executed anonymization module 318 may parse the one or more elements of type-preserving mapping data 154 and determine that the customer phone number (e.g., "1-202-555-1234") is associated with a type-preserving, element of partially anonymized data 320 (e.g., "1-202-999-9999"). In some instances, the type-preserving, partially anonymized data element 320 (e.g., "1-202-999-9999") may mask fully a predetermined portion of the actual customer phone number (e.g., the prefix "555" and the line number "1234"), while maintaining an additional, predetermined portion of the actual customer phone number in unmasked form (e.g., the country code "1" and the area code "202"). As illustrated in FIG. 3B, executed anonymization module 318 may perform operations that anonymize the customer phone number "1-202-555-1234" maintained within row 212 by replacing the customer phone number "1-202-555-1234" with the corresponding, type-preserving, partially anonymized data element 320, e.g., "1-202-999-9999," that maintains the format, structure, or composition of the actual customer phone number.

Executed anonymization module 318 may also parse the one or more elements of type-preserving mapping data 154 and determine that the alphanumeric identifier of the financial product (e.g., the sixteen-digit account number "1234-5678-9012-3456") is associated with, and mapped to, with a type-preserving element of fully anonymized data 322 (e.g., "9999-9999-9999-9999"). In some instances, type-preserving element of fully anonymized data 322 (e.g., "9999-9999-9999-9999") that masks fully each element of the sixteen-digit account number while maintaining the table-specific composition and structure of the actual sixteen-digit account number. Executed anonymization module 318 may perform operations that anonymize the sixteen-digit account number "1234-5678-9012-3456" maintained within row 212 by replacing the sixteen-digit account number "1234-5678-9012-3456" with the corresponding, type-preserving, fully anonymized data element 322, e.g., "9999-9999-9999-9999," that maintains the format, structure, or composition of the actual sixteen-digit account number.

Further, although not illustrated in FIG. 3C, the elements of type-preserving mapping data 154 may fail to associate, or map, a particular element of confidential customer data maintained within the rows of temporal partition 208, and subject to reversible tokenization in accordance with the elements of configuration data 150 (e.g., one or more the customer phone numbers or customer account identifiers maintained in columns 214C or 214D of row 212) to a corresponding, type-preserving element of fully or partially anonymized data. Based on the failure of the elements of token-based mapping data 152 to fail to map the particular element of confidential customer data to any type-preserving element of fully or partially anonymized data, executed anonymization module 318 may perform operations (not illustrated in FIG. 3C) that generate a corresponding element of fully or partially anonymized data that obfuscates the element of confidential customer data while maintaining a format, structure, or composition of the element of confidential customer data.

By way of example, the particular element of confidential customer data may correspond to a sixteen-digital account number maintained within one of the rows of partition 208 at column 214D. Based on the determination that the elements of type-preserving mapping data 154 fails to associate the sixteen-digital account number with any type-preserving element of fully or partially anonymized data, executed anonymization module 318 may parse the elements of table schema data 144 associated with source data table 142 (e.g., as maintained within aggregated data store 136), and obtain information that characterizes a format, structure and composition of the sixteen-digital account number maintained within column 214D. By way of example, the obtained information may specify that the sixteen-digital account number is composed of four, sequential four-digit character strings separated internally by dashes (e.g., "-"), and executed anonymization module 318 may perform operations that generate randomly (or pseudo-randomly) four, four-digit character strings (e.g., based on an implementation of one or more random or pseudo-random sequence generation processes, etc.), and generate a type-preserving element of fully anonymized data based on the four, four-digital random sequences in accordance with the elements of table schema data 144. In some instances, executed anonymization module 318 may also perform operations that augment the elements of type-preserving mapping data to include information that associates the sixteen-digital account number with the generated, type-preserving element of fully anonymized data, and that replace the sixteen-digital account number within the rows of partition 208 with the newly generated, type-preserving element of fully or partially anonymized data.

Referring back to FIG. 3C, executed anonymization module 318 may perform similar operations to anonymize partially, or fully, the customer phone numbers and the account identifiers maintained within each additional, or alternate row (e.g., within respective ones of columns 214C and 214D) of temporal partition 208 of source data table 142, and may store the anonymized elements of confidential customer data within corresponding portions of source data table 142 in aggregated data store 136. Further, upon anonymization of the elements of confidential customer data maintained in columns 214C and 214D of each row within temporal partition 208 of source data table 142, executed pre-processing module 220 may generate one or more elements of update data 324 that confirms a completion of the anonymization of the elements of confidential customer data maintained columns 214C and 214D within the rows of partition 208, and perform operations that augment delta table 146 to include the elements of update data 324, e.g., to update delta table 146 to reflect the completion on the anonymization of the confidential customer data maintained within the columns of temporal partition 208 in accordance with the elements of configuration data 150 associated with source data table 142.

Further, although not illustrated in FIG. 3C, executed anonymization module 318 may also perform any of the exemplary processes described herein to obtain a table identifier and delta table associated with each of the additional source data tables maintained within aggregated data store 136. Based on the table identifiers, executed anonymization module 318 may also perform any of the exemplary processes described herein to access configuration data store 138 and obtain one or more elements of configuration data associated with each of the additional source data tables, and to obtain, for each of the additional source data tables, data identifying one or more columns maintaining elements of confidential data that are subject to one or more anonymization operations consistent with the elements of type-preserving mapping data 154, such as, but not limited to, column or field names associated with the customer phone numbers or the account identifiers within corresponding ones of the additional source data tables. Executed anonymization module 318 may also parse the delta table associated with each of the additional source data tables, and perform any of the exemplary processes described herein to identify one, or more, temporal partitions of each of the additional source data files that await anonymization consistent with the elements of type-preserving mapping data 154.

For each of the additional source data tables within aggregated data store, executed anonymization module 318 may perform any of the exemplary processes described herein to replace the elements of confidential data within the rows of corresponding ones of the temporal partitions with a corresponding one of the type-preserving, fully or partially anonymized elements of data within the elements of type-preserving mapping data 154, and to store the anonymized elements of confidential customer data within portions of corresponding ones of the additional source data tables, e.g., within aggregated data store 136. Further, upon anonymization of the elements of confidential customer data maintained within one, or more, of the additional source data tables, executed anonymization module 318 may perform any of the exemplary processes described herein to update corresponding delta tables to reflect a completion of the anonymization of the elements of confidential customer data maintained within corresponding ones of the additional source data tables.

Through an implementation of one or more of these exemplary processes described herein, executed anonymization module 318 may obfuscate actual elements of confidential customer data maintained within columns of source data table 142 and the additional, or alternate, source data tables of aggregated data store 136 with corresponding elements of type-preserving, fully or partially anonymized data, which may preserve a referential integrity of these columns across the source data tables during SQL-based join operations. Further, in some instances, and prior to provisioning the now-tokenized source data tables to one or more distributed data repositories accessible to computing systems and devices across network 120, such as distributed data repository 180, executed de-risking engine 164 may perform any of the exemplary processes described herein to implement selectively one or more SQL-based operations (e.g., one or more SQL-based join operations) involving each, or a selected subset of, the anonymized source data tables maintained within aggregated data store, either alone or in conjunction with one or more table-specific exclusion operations specified within corresponding elements of configuration data maintained within configuration data store 138. Based on the selective implementation of the one or more SQL-based operations and/or the table-specific exclusion operations, executed de-risking engine 164 may generate an anonymized data table (such as anonymized data table 326 of FIG. 3D), which the distributed components of FI computing system 130 may provision to distributed data repository 180.

Figure 3D:
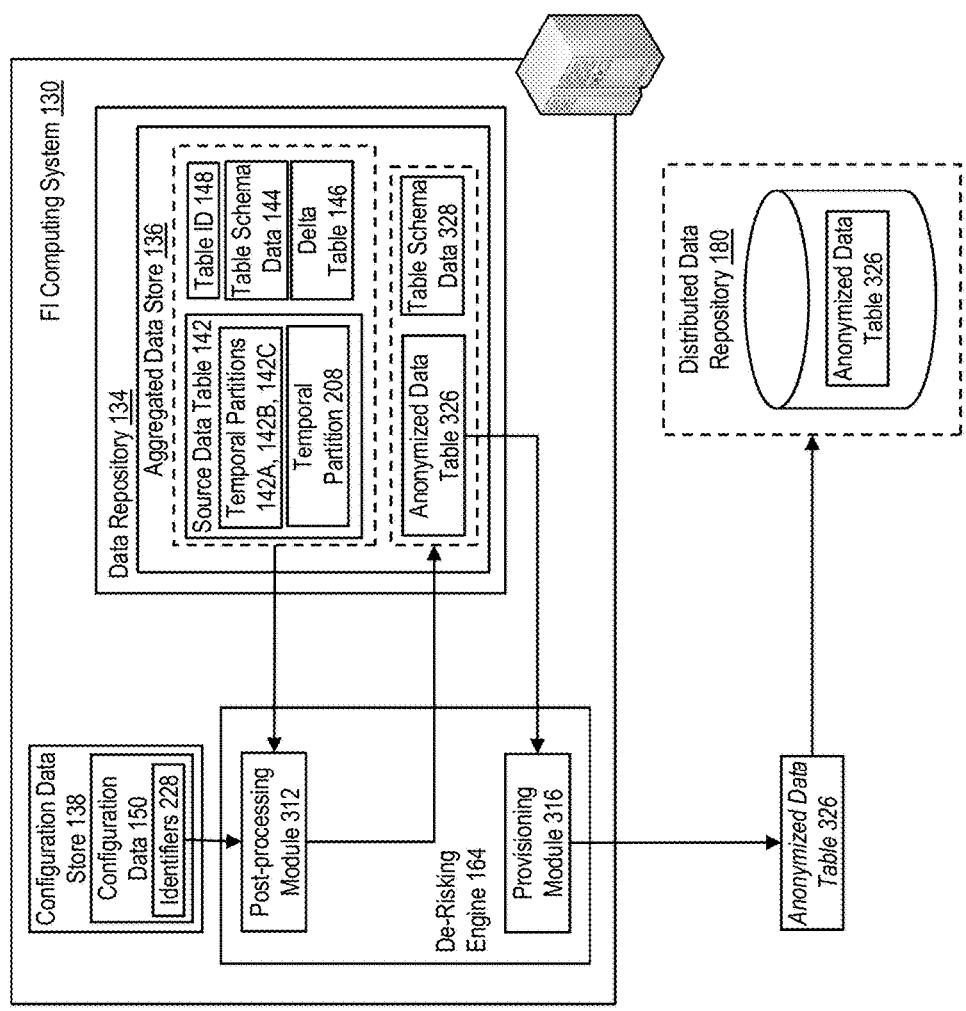

Referring to FIG. 3D, post-processing module 312 of executed de-risking engine 164 may perform any of the exemplary processes described herein that access one or more of the anonymized source data tables maintained within aggregated data store (including anonymized source data table 142), and obtain corresponding elements of table schema data and corresponding table identifiers associated with each of the accessed, anonymized source data tables (e.g., the elements of table schema data 144 and the elements of configuration data 150). Based on the elements of configuration data associated with each of the tokenized data tables (including the elements of configuration data 150 associated with tokenized source data table 142), and based on the elements of table schema data identifying the columns maintained within each of the tokenized data tables (including the elements of table schema data 144 associated with tokenized source data table 142), executed post-processing module 312 may perform operations, described herein, that implement selectively the one or more SQL-based join operations involving corresponding ones of the columns of the tokenized source data tables (e.g., as identified the table-specific elements of the configuration data, such as the column or field names specified by identifiers 226 of the elements of configuration data 150 associated with tokenized source data table 142), and that implement one or more exclusion operations that exclude columns from one or more of the tokenized source data tables from the selective implementation of the SQL-based join operations (e.g., as identified the table-specific elements of the configuration data, such as the column or field names specified by identifiers 228 of the elements of configuration data 150 associated with tokenized source data table 142).

Further, based on the selective implementation of the one or more SQL-based join operations involving the corresponding columns of the tokenized source data tables and in some instances, based on the selective implementation of the one or more exclusion operations described herein, executed post-processing module 312 may generate anonymized data table 326 that includes the selectively joined columns of the anonymized source data tables, and may store anonymized data table 326 within a corresponding portion of aggregated data store 136. In some instances, executed post-processing module 312 may also perform operations that generate, and store in within aggregated data store 136, one or more elements of table schema data 328, which identifies each of the columns maintained anonymized data table 326 (e.g., via a column name or field name) and that associates one or more of the column or field names within a structure, format, or composition of corresponding data elements.

As described herein, provisioning module 316 of executed de-risking engine 164 may perform operations that obtain anonymized data table 326 from aggregated data store 136, and that cause the FI computing system 130 to transmit anonymized data table 326 across network 120 to one or more computing systems that establish and maintain distributed data repository 180 (and additionally, alternatively, to transmit anonymized data table 326 to distributed modelling system 170 directly across network 120). These computing components (not illustrated in FIG. 3D) may receive anonymized data table 326, and may perform operations that store anonymized data table 326 within a portion of distributed data repository 180. In some instances, the anonymized data table 326 may include fully, or partially anonymized elements of confidential data and elements of non-confidential data disposed within corresponding rows and columns (e.g., in accordance with the elements of table schema data 328) and as described herein, the computing components of distributed modelling system 170 may access portions of anonymized data table 326 maintained within distributed data repository 180, and based on the accessed portions of anonymized data table 326, the computing components of distributed modelling system 170 perform operations that generate one or more feature vectors suitable for ingestion by one or more machine-learning or artificial-intelligence processes (e.g., a gradient-boosted, decision-tree process, etc.)

The computing components of distributed modelling system 170 may, for example, perform operations that apply the one or more machine-learning or artificial-intelligence processes to the generated feature vectors during a process training phase and during a subsequent validation phases. In other instances, the computing components of distributed modelling system 170, or other computing systems or devices operating within environment 100, may access portions of anonymized data table 326, and may perform operations that test, debug, or benchmark an operation or a performance of one or more executable application programs or other elements of executable code, such as an application programming interface (API) during pre-deployment development phase. In some instances, the portions of anonymized data table 326 accessed by distributed modelling system 170, or the other computing systems or devices operating within environment 100, may represent corresponding elements of "test" data associated with the training and validation of the one or more one or more machine-learning or artificial-intelligence processes, or with the testing, debugging, or benchmarking of the one or more executable application programs or other elements of executable code, and the elements of type-preserving mapping data 154 may establish a single-use "lookup" table, which executed de-risking engine 164 may delete (e.g., from the corresponding portion of de-risking data store 140, etc.) upon completion of the exemplary anonymization processes described herein.

In other examples, described herein, the computing components of distributed modelling system 170 may perform operations that apply one or more trained machine-learning or artificial-intelligence processes to the generated feature vectors during an inferencing phase. Through the application of the one or more trained machine-learning or artificial-intelligence processes to corresponding ones of the generated feature vectors the computing components of distributed modelling system 170 may perform operations that generate an output data table that includes one or more elements of customer-specific predicted output data, such as, but not limited to, a predicted likelihood that a customer will access a financial product, or will be involved in a default or delinquency event involving that financial product during a future temporal interval, and the provision the generated output data to FI computing system 130. In some instances, the portions of anonymized data table 326 accessed by distributed modelling system 170, may represent corresponding elements of "production" data associated with a deployment of the one or more one or more machine-learning or artificial-intelligence processes during an inferencing phase, and executed de-risking engine 164 may maintain the elements of type-preserving mapping data 154 within de-risking data store 140, e.g., for use in a subsequent process that reverses the anonymization of certain elements of data maintained within the output data table.

Figure 4:
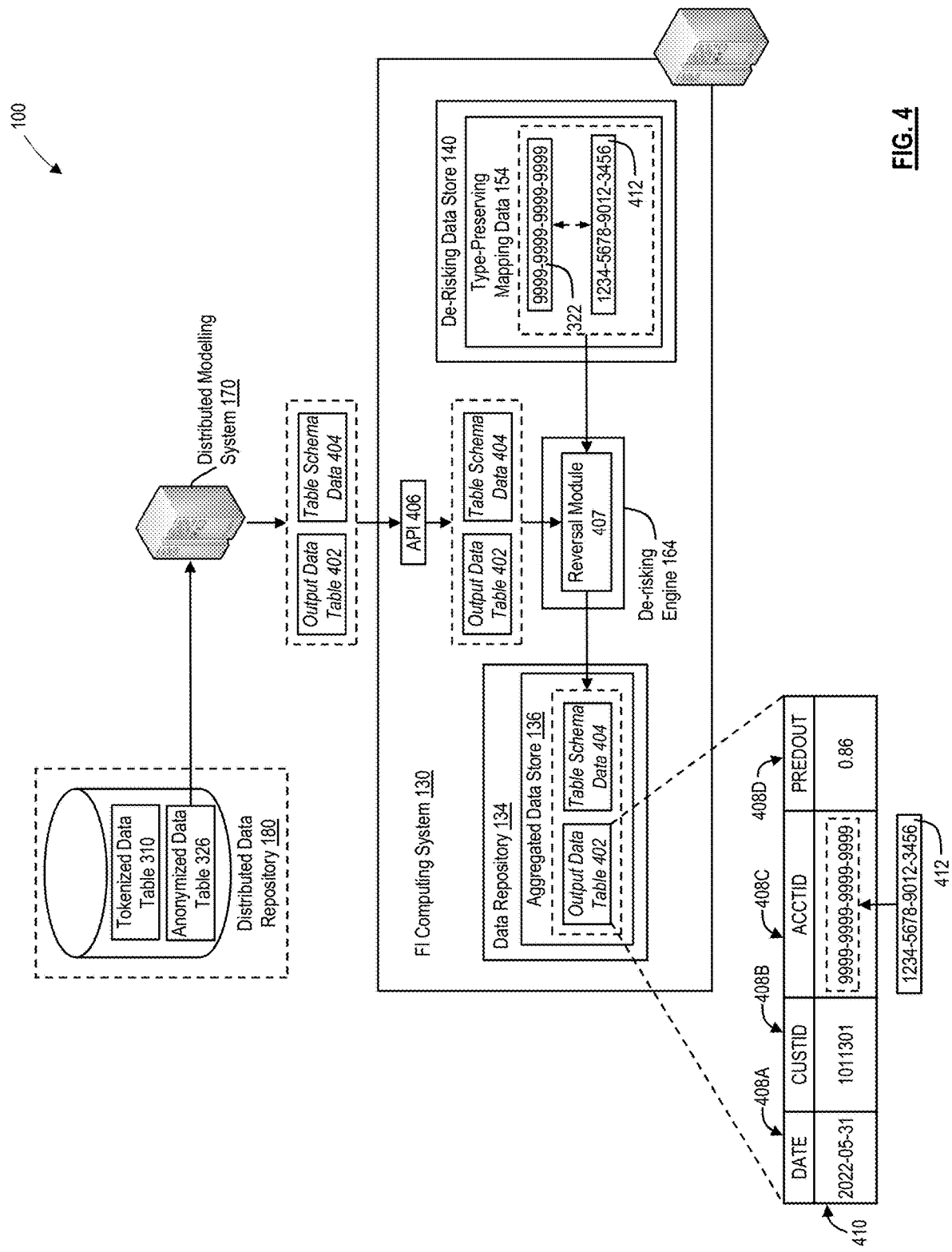

Referring to FIG. 4, distributed data repository 180 may maintain, among other things, one or more of: (i) tokenized data table 310, which obfuscates distinct elements of confidential customer data, or distinct, but contextually consistent, elements of confidential customer data customer corresponding, and unique, digital tokens; and/or (ii) anonymized data table 326, which obfuscates distinct elements of confidential customer data using type-preserving elements of fully or partially anonymized data that maintains a format, structure, or composition of corresponding ones of the distinct elements of confidential customer data. In some instances, the computing components of distributed modelling system 170 may access portions of tokenized data table 310, or of anonymized data table 326, maintained within distributed data repository 180, and based on the accessed portions of tokenized data table 310, or of anonymized data table 326, the computing components of distributed modelling system 170 perform operations that generate one or more feature vectors suitable for ingestion by one or more trained machine-learning or artificial-intelligence processes (e.g., a gradient-boosted, decision-tree process, etc.) and based on an application of the one or more trained machine-learning or artificial-intelligence processes to corresponding ones of the feature vectors, the computing components of distributed modelling system 170 may perform operations that generate an output data table 402 that, among other things, includes one or more elements of customer-specific predicted output data, as described herein.

By way of example, output data table 402 may maintain the elements of customer-specific predicted output data, elements of tokenized or anonymized elements of confidential customer data, and/or elements of non-confidential customer data within corresponding within a plurality of customer-specific rows and within corresponding columns. In some instances, the computing components of distributed modelling system 170 may perform operations that generate one or more elements of table schema data 404, which identify each of the columns maintained within output data table 402 (e.g., via a column or field name), and may associate each of the column names with a structure, format, or composition of corresponding ones of the elements of tokenized or anonymized data and/or the elements of non-confidential data. By way of example, and for a particular column of output data table 402 that includes tokenized or anonymized data, the corresponding elements of table schema data 404 may include data specifying that the particular column of output data table 402 includes elements of tokenized data or type-preserving elements of fully or partially anonymized data, and when the particular column includes the type-preserving elements of fully or partially anonymized data, the corresponding elements of table schema data 404 may also specify a structure, format, or composition of the fully or partially anonymized data. In some instances, the computing components of distributed modelling system 170 mat transmit output data table 402 and the elements of table schema data 404 across network 120 to FI computing system 130.

As illustrated in FIG. 4, a programmatic interface established by FI computing system 130, such as an application programming interface (API) 406 associated with executed de-risking engine 164, may receive output data table 402 and the elements of table schema data 404, and may route the output data table 402 and the elements of table schema data 404 to a reversal module 407 of executed de-risking engine 164, which may store output data table 402 and the elements of table schema data 404 within a corresponding portion of aggregated data store 136. In some instances, executed reversal module 407 may parse the elements of table schema data 404, which identifies each of the columns maintained within output data table 402 (e.g., via a column or field name), and associate each of the column names with a structure, format, or composition of corresponding ones of the elements of tokenized or anonymized data and/or the elements of non-confidential data. Further, based on the elements of table schema data 404, executed reversal module 407 may identify each of the columns of that maintain elements of tokenized or anonymized data, and for each of the identified columns, executed reversal module 407 may perform operations, described herein, that reverse a corresponding one of the tokenization or anonymization processes described herein, and replace each of the elements of tokenized or anonymized data with a corresponding element of confidential customer data.

Based on the elements of table schema data 404, executed reversal module 407 may determine that output data table 402 maintains elements of non-confidential temporal data characterizing the generation of output data table 402 within column 408A (e.g., associated with column name "DATE"), non-confidential alphanumeric customer identifiers within column 408B (e.g., associated with column name "CUSTID"), type-preserving elements of fully anonymized data representative of account identifiers associated with corresponding ones of the customer identifiers within column 408C (e.g., associated with column name "ACCTID"), and elements of non-confidential predicted output data within column 408D, which include numerical values ranging from zero to unity (e.g., associated with column name "PRED-OUT"). In some examples, for each of the rows of output data table 402, executed reversal module 407 may perform operations that: (i) obtain the type-preserving elements of fully anonymized data maintained within column 408C (e.g., that obfuscates or masks a corresponding account identifier, such as a sixteen-digit account number); (ii) access the element of type-preserving mapping data 154 (e.g., within de-risking data store 140) and obtain a corresponding, confidential account identifier (e.g., a sixteen-digit account number) associated with the type-preserving element of fully anonymized data; and (iii) reverse the prior type-preserving anonymization operation by replacing the type-preserving elements of fully anonymized data with the corresponding, confidential account identifier.

By way of example, as illustrated in FIG. 4, the plurality of customer-specific rows of output data table 402 may include, among other things, customer-specific row 410, and customer-specific row 410 may maintain temporal data characterizing the generation of output data table 402 (e.g., "2022-05-31") within column 408A, a corresponding customer identifier (e.g., "1011301") within column 408B, type-preserving element of fully anonymized data 322 (e.g., "9999-9999-9999-9999") within column 408C that masks a confidential, sixteen-digit account number associated with the corresponding customer identifier, and a corresponding element of predicted output data (e.g., "0.86") within column 408D. The disclosed embodiments are, however, not limited to these exemplary columns (or sequence of columns) and to these exemplary customer-specific rows, and in other instance, output data table 402 may include additional, or alternate, numbers of customer-specific rows that maintain data within any additional, or alternate, columns appropriate to tokenized data table 310, anonymized data table 326, and/or the predicted output generated by distributed modelling system 170.

Executed reversal module 407 may, for example, obtain type-preserving element of fully anonymized data 322 from customer-specific row 410 (e.g., as maintained within column 408C), and based on the elements of type-preserving mapping data 154, executed reversal module 407 may determine that type-preserving element of fully anonymized data 322 (e.g., "9999-9999-9999-9999") is associated with alphanumeric account identifier 412 (e.g., the sixteen-digit account number "1234-5678-9012-3456") of the financial product held by the corresponding customer of the financial institution. Executed reversal module 407 may also perform operations, described herein, to reverse the anonymization of the account identifier within row 410 of output data table 402 by replacing type-preserving element of fully anonymized data 322 with alphanumeric account identifier 412 (e.g., "1234-5678-9012-3456") at column 408C of row 410.

Further, in some instances (not illustrated in FIG. 4), executed reversal module 407 may also perform operations that post-process or enrich certain elements of non-confidential data maintained within columns 408A, 408B, or 408D of row 410 of output data table 402, and additionally or alternatively, the de-anonymized account identifier within column 408C of row 410 of output data table 402. For example, executed reversal module 407 may perform operations that modify a format of the temporal data maintained at column 408A of row 212 (e.g., "2022-05-31") to conform to format associated with aggregated data store 136 (e.g., "05-31-2022"). Executed reversal module 407 may perform similar operations to reverse the previously anonymized account identifiers maintained at column 408C of within each additional, or alternate row of output data table 402 (and in some instances, apply one or more of the post-processing and enrichment operations described herein), and may store the de-anonymized elements of confidential customer data within corresponding portions of output data table 402 in aggregated data store 136.

The embodiments are, however, not limited to output data tables that maintain elements of anonymized, confidential customer data (e.g., the type-preserving elements of fully or partially anonymized data described herein) within corresponding columns. In other examples (not illustrated in FIG. 4), and based on the elements of table schema data 404, executed reversal module 407 may determine that output data table 402 maintains tokenized account identifiers within column 408C. Further, and for each of the rows of output data table 402, such as row 410, executed reversal module 407 may obtain a digital token maintained within column 408C, may access the elements of token-based mapping data 152 (e.g., within de-risking data store 140) and obtain a corresponding, confidential account identifier associated with the obtained digital token (e.g., a corresponding, sixteen-digit account number), and perform operations that reverse the prior tokenization of the confidential, customer account customer identifier by replacing the digital token with the corresponding, sixteen-digit account number.

Figure 5:
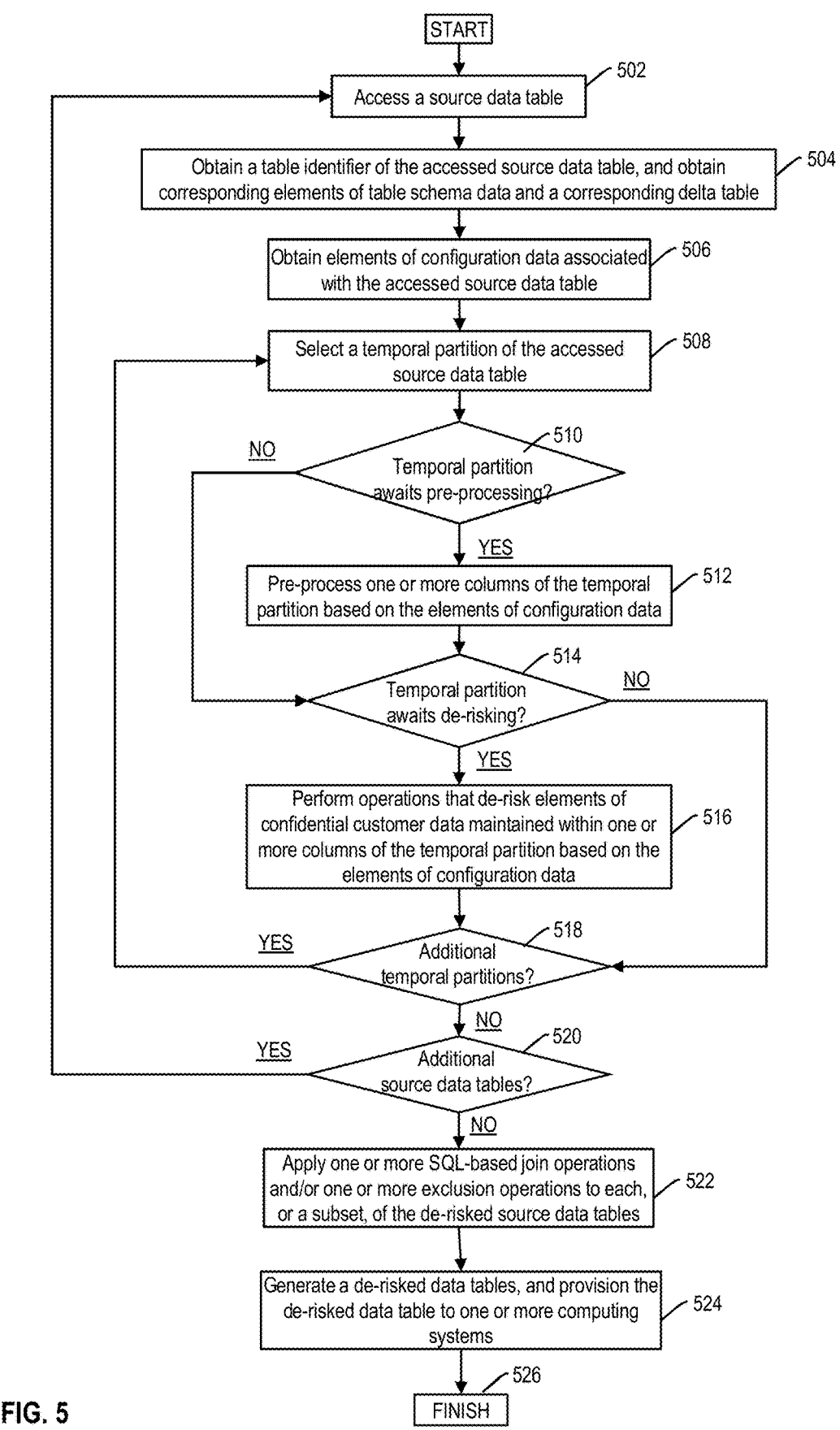
FIGS. 5, 6A, and 6B are flowcharts of exemplary processes de-risking columns of confidential and non-confidential customer data maintained across one or more source data tables, in accordance with some exemplary embodiments.
Figure 6A:
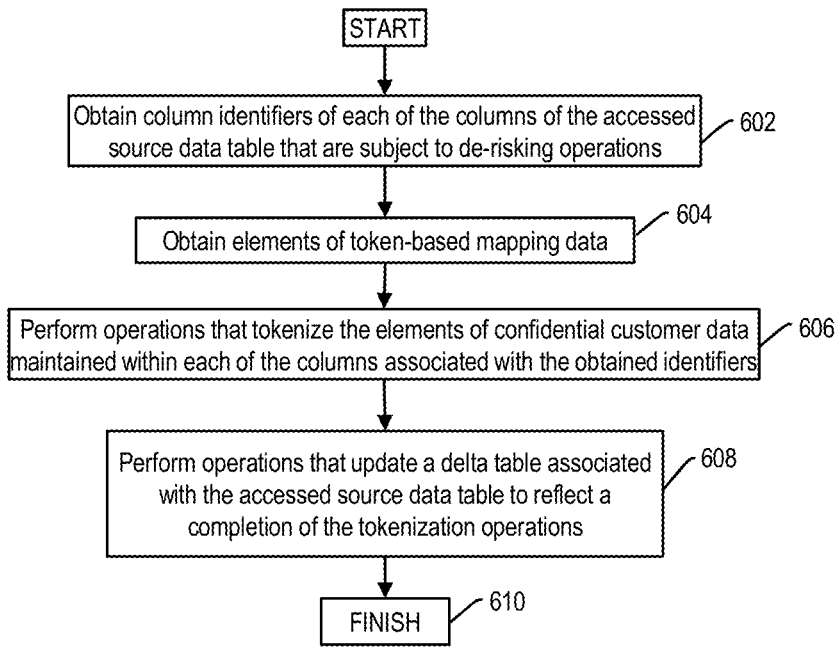
Figure 6B:
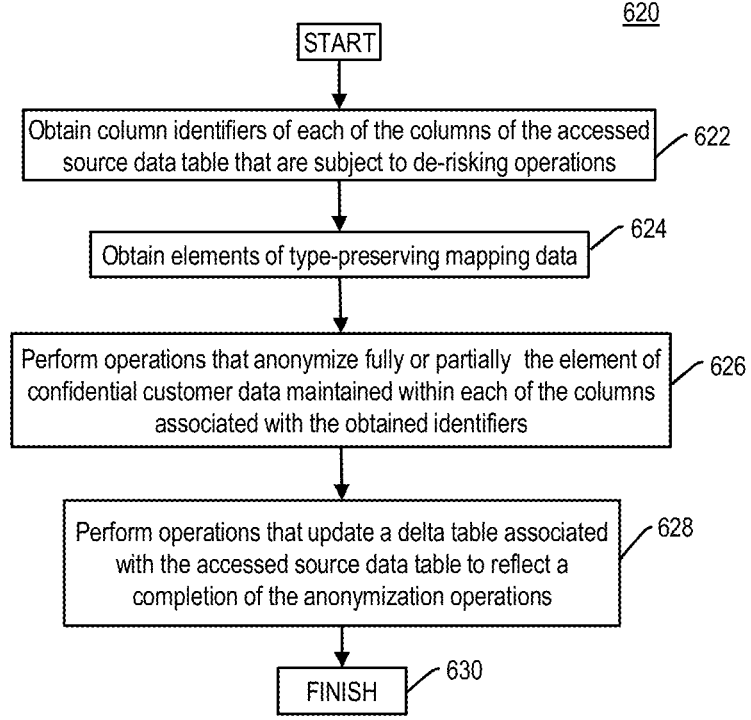

FIGS. 5, 6A, and 6B are flowcharts of exemplary processes 500 de-risking columns of confidential and non-confidential customer data maintained across one or more source data tables, in accordance with some exemplary embodiments. As described herein, one or more of the steps of exemplary process 500 of FIG. 5, exemplary process 600 of FIG. 6A, and exemplary process 620 of FIG. 6B may de-risk the columns of confidential and non-confidential customer data while maintaining a referential integrity of the de-risked columns across the one or more source tables during post-processing operations, such as, but not limited to, one or more SQL-based join operations. In some instances, one or more computing systems, such as, but not limited to, one or more of the distributed components of FI computing system 130, may perform one or more of the steps of exemplary processes 500, 600, and 620 as described herein.

Referring to FIG. 5, FI computing system 130 may perform any of the exemplary processes described herein to access a source data table maintained within a corresponding, locally accessible data repository (e.g., in step 502 of FIG. 5). In some instances, the locally accessible data repository (e.g., aggregated data store 136 of data repository 134 of FIG. 1) may maintain the accessed source data table (e.g., data table 142 of FIG. 1) in conjunction with one or more additional data tables, and the accessed source data table, and each of the additional source data tables, may maintain, within corresponding columns, elements of the confidential and non-confidential customer data obtained from source systems 110 during a current temporal interval and during one or more prior temporal intervals (e.g., the elements of customer profile, account, or transaction data obtained from internal source system 110A and the elements of credit-bureau data obtained from external system 110B, etc.). Further, and as described herein, the elements of confidential and non-confidential data maintained within the columns of the accessed source data table (and/or one or more of the additional source data tables) may be disposed within respective ones of a plurality of temporal partitions associated with a corresponding temporal interval of a predetermined or varying duration.

FI computing system 130 may also perform any of the exemplary processes described herein to obtain a table identifier of the accessed source data table, and to obtain elements of table schema data and a corresponding delta table associated with the accessed source data table (e.g., in step 504 of FIG. 5). As described herein, the elements of table schema data may identify each of the columns maintained within the accessed source data table 142 (e.g., via a column or field name), and may associate each of the column names with a structure, format, or composition of corresponding ones of the elements of confidential or non-confidential data. The corresponding delta table may identify and characterize each of the temporal partitions and the temporal intervals that establish each of these temporal partitions, and in some instances, the corresponding delta table may also identify one or more prior preprocessing and/or de-risking operations applied to one or more of the temporal partitions, as well as one or more temporal partitions awaiting preprocessing and/or de-risking using any of the exemplary processes described herein.

Further, based on the table identifier, FI computing system 130 may also perform any of the exemplary processes described herein to obtain one or more elements of configuration data associated with the accessed source data table (e.g., in step 506 of FIG. 5). As described herein, the elements of configuration data may include, among other things, identifiers of one or more columns or fields of the accessed source data table that are subject to one or more of the exemplary pre-processing operations described herein (e.g., corresponding column names or field names consistent with the elements of table schema data, etc.), along with additional information that identifies and characterizes the one or more pre-processing operations applicable to corresponding one of the columns of fields of the accessed source data table. The elements of configuration data may also include identifiers of one or more columns or fields of the accessed source data table that are subject to one or more of the exemplary de-risking operations described herein (e.g., corresponding column names or field names consistent with the elements of table schema data, etc.), and in some instances, identifiers of one or more columns or fields of the accessed source data table that are subject to exclusion from an output data table generated through an application of one or more SQL-based join operations to the accessed source data table and to other source data tables maintained within the locally accessible data repository.

FI computing system 130 may perform any of the exemplary processes described herein to select a corresponding one of the temporal partitions of the accessed source data table (e.g., in step 508 of FIG. 5). As described herein, the selected temporal partition of the accessed source data table may maintain elements of confidential and non-confidential customer data within corresponding rows and corresponding column, e.g., as specified within the elements of table schema data. Further, and based on portion of the delta table, FI computing system 130 may determine whether the selected temporal partition awaits preprocessing using any of the exemplary processes described herein (e.g., in step 510 of FIG. 5).

For example, if FI computing system 130 were to determine that the selected temporal partition awaits preprocessing (e.g., step 510; YES), FI computing system 130 may perform any of the exemplary processes described herein to apply one or more pre-processing operations to the elements of confidential or non-confidential customer data maintained within one or more of the columns of the selected temporal partition in accordance with the obtained elements of the configuration data associated with the accessed source data table (e.g., in step 512 of FIG. 5). As described herein, the one or more pre-processing operations may include, but are not limited to, a full redaction operation that replaces an actual instance of the confidential or non-confidential customer data maintained with a column of the selected temporal partition (e.g., as specified within the obtained elements of configuration data) with a corresponding alphanumeric character string, and a partial redaction operation that replaces a predetermined portion of an actual instance of the confidential or non-confidential customer data maintained with a column of the selected temporal partition (e.g., as specified within the obtained elements of configuration data) with a corresponding alphanumeric character string.

Further, and based on portion of the delta table, FI computing system 130 may determine whether the selected temporal partition awaits de-risking using any of the exemplary processes described herein (e.g., in step 514 of FIG. 5). If, for example, FI computing system 130 were to determine that the selected temporal partition awaits de-risking (e.g., step 514; YES), FI computing system 130 may perform any of the exemplary processes described herein to de-risk the elements of confidential customer data maintained within one or more columns of the selected temporal partition in accordance with the elements of configuration data associated with the accessed source data table (e.g., in step 516).

By way of example, described in reference to FIG. 6A, FI computing system 130 may perform one or more of the exemplary de-risking processes described herein to selectively, and reversibly, tokenize elements of customer-specific confidential data maintained within the selected temporal partition of the accessed source data table based on the obtained elements of configuration data, which may identify the one or more columns that include confidential customer data, and on elements of token-based mapping data, which associate each of the elements of confidential customer data within value of a digital token that obfuscates the element of customer-specific confidential data across the multiple, distinct source data tables. Referring to FIG. 6A, FI computing system 130 may parse the obtained elements of configuration data associated with the accessed source data table, and may obtain identifiers (e.g., column or field names consistent with the elements of table schema data) of each of the columns of the source data table that are subject to one or more of the exemplary de-risking operations described herein (e.g., in step 602 of FIG. 6A). Further, FI computing system 130 may also perform operations that obtain, from the locally accessible data repository, one or more elements of token-based mapping data (e.g., in step 604 of FIG. 6A).

As described herein, the source data tables maintained within the locally accessible data repository, including the accessed source data table, may maintain, within corresponding columns, a particular element of confidential customer data in a common format, structure, or composition, and the elements of token-based mapping data may associate that particular element of the confidential customer data with a corresponding, and unique, digital token that obfuscates the particular element of confidential customer data across the columns of the source data tables maintained within locally accessible data repository. Additionally, the source data tables maintained within the locally accessible data repository, including the accessed source data table, may also maintain a plurality of distinct, but contextually consistent, elements of confidential customer data in a variety of distinct formats, structures or compositions. In some instances, the elements of token-based mapping data may associate each of the distinct, but contextually consistent, elements of the confidential customer data within the source data tables maintained within the locally accessible data repository with a corresponding, and unique, digital token, which may obfuscate each of the distinct, but contextually consistent, elements of confidential customer data across the columns of the source data tables maintained within the locally accessible data repository. In some instances, each of these digital tokens may include a corresponding, and distinct, randomly generated alphanumeric character string having a predetermined length (e.g., thirty-two characters) which may reduce occurrences of collisions between corresponding ones of the digital tokens and the tokenized elements of confidential customer data.

Further, and for each of the customer-specific rows of the selected temporal partition of the accessed source data table, FI computing system 130 may perform any of the exemplary processes described herein to tokenize the element of confidential customer data maintained within each of the columns associated with the obtained identifiers by replacing that element of confidential customer data with a corresponding, and unique, digital token maintained within the elements of token-based mapping data (e.g., in step 606 of FIG. 6A). In some instances, described herein, the elements of token-based mapping data may fail to map a particular element of confidential customer data maintained within the rows of the selected temporal partition, and subject to reversible tokenization in accordance with the obtained elements of configuration data 150 to a corresponding one of the unique digital tokens. Based on the failure of the elements of token-based mapping data to fail to map the particular element of confidential customer data to the corresponding, unique digital token, FI computing system 130 may perform additional operations in step 606 that obtain elements of process data characterizing a token-generation process associated with the elements of token-based mapping data, and that apply the token-generation process to at least a portion of the particular element of confidential customer data.

Based on the application of the token-generation process to at least the portion of the particular element of confidential customer data FI computing system 130 may generate a randomly generated alphanumeric character string having the predetermined length or structure (e.g., thirty-two characters), which may correspond to a unique digital token that obfuscates the particular element of confidential customer data across the columns of the source data tables maintained within the locally accessible data repository (e.g., while maintaining referential integrity), FI computing system 130 may perform any of the exemplary processes described herein, in step 606 of FIG. 6, that modify the elements of token-based mapping data to include additional information that associates with element of confidential data with the newly generated, and unique, digital token (e.g., the randomly generated alphanumeric character string having the predetermined length or structure), and that tokenize the particular element of confidential customer data within the rows of the selected temporal partition of the accessed source data table using the newly generated, and unique, digital token, e.g., by replacing the particular element of confidential customer data within the rows of the selected temporal partition with the newly generated, and unique, digital token.

Certain of these exemplary tokenization processes may maintain referential integrity between the columns of the source data tables maintained within the locally accessible data repository, while obscuring the corresponding elements of confidential customer data, and may facilitate customized, SQL-based join operations across one or more of the source data tables maintained within aggregated data store 136 (e.g., within multiple, distinct database). Further, by maintaining a single data structure that facilitates a reversible tokenization of columns of data across multiple source data tables (e.g., the elements of token-based mapping data), certain of these exemplary tokenization processes may reduce a number of tables needed for tokenization and de-risking, when compared to many conventional tokenization processes that associate each of the multiple source data tables with a corresponding tokenization table that fails to maintain referential integrity across the tokenized source tables.

FI computing system 130 may also perform operations, described herein, to update a delta table associated with the accessed source data table to reflect the completion of the tokenization of the confidential customer data maintained within the identified columns of selected temporal partition in accordance with the elements of configuration data associated with accessed source data table 142 (e.g. in step 608 of FIG. 6A). Exemplary process 600 is then complete in step 610.

In other examples, described in reference to FIG. 6B, FI computing system 130 may also perform one or more of the exemplary de-risking processes described herein to selectively, and reversibly (or in some instances, irreversibly) anonymize the elements of confidential customer data maintained within the one or more columns of the selected temporal partition based on the obtained elements of configuration data associated with the selected source data table, and based on elements of type-preserving mapping data maintained, which associate one or more of elements of confidential customer data with a corresponding element of fully or partially anonymized data that obfuscates the corresponding element of confidential customer data across the multiple source data tables of the locally accessible data repository while maintaining a table-specific format, structure, or composition of the corresponding element of confidential customer data. Referring to FIG. 6B, FI computing system 130 may parse the obtained elements of configuration data associated with the accessed source data table, and may obtain identifiers (e.g., column or field names consistent with the elements of table schema data) of each of the columns of the source data table that are subject to one or more of the exemplary de-risking operations described herein (e.g., in step 622 of FIG. 6B).

Further, FI computing system 130 may also perform operations that obtain, from the locally accessible data repository, one or more elements of type-preserving mapping data (e.g., in step 624 of FIG. 6B). As described herein, the elements of type-preserving mapping data may associate actual elements of confidential customer data (e.g., which may be maintained within the selected temporal partition of the accessed source data table in table-specific formats, structures, or compositions) with elements of fully, or partially anonymized data that maintain the table-specific formats, structures, or compositions characterizing corresponding ones of the actual elements of confidential customer data (e.g., elements of "type-preserving" anonymized data that a preserve a "data type" associated with the corresponding ones of the actual elements of confidential customer data).

For each of the customer-specific rows of the selected temporal partition of the accessed source data table, FI computing system 130 may perform any of the exemplary processes described herein to anonymize partially or fully the element of confidential customer data maintained within each of the columns associated with the obtained identifiers by replacing that element of confidential customer data with a corresponding, type-preserving element of fully or partially anonymized data maintained within the elements of type-preserving mapping data (e.g., in step 626 of FIG. 6B). Further, in some instances, the elements of type-preserving mapping data may fail to associate, or map, a particular element of confidential customer data maintained within the customer-specific rows of the selected temporal partition (and subject to tokenization in accordance with the elements of configuration data) to a corresponding, type-preserving element of fully or partially anonymized data. Based on the failure of the elements of token-based mapping data to fail to map the particular element of confidential customer data to any type-preserving element of fully or partially anonymized data, FI computing system 130 may perform any of the exemplary processes described herein, in step 626 of FIG. 6B, to generate a type-preserving element of fully or partially anonymized data that obfuscates the element of confidential customer data while maintaining a format, structure, or composition of the element of confidential customer data. FI computing system 130 may perform any of the exemplary processes described herein, in step 626 of FIG. 6, that modify the elements of type-preserving mapping data to include additional information that associates with element of confidential data with the newly generated, type-preserving element of fully or partially anonymized data, and that anonymize the particular element of confidential customer data within the rows of the selected temporal partition of the accessed source data table using the newly generated, newly generated, type-preserving element of fully or partially anonymized data, e.g., by replacing the particular element of confidential customer data within the rows of the selected temporal partition with the newly generated, type-preserving element of fully or partially anonymized data.

In some instances, by replacing the actual elements of confidential customer data within corresponding columns of the one or more source data tables with selectively anonymized, type-preserving data elements, certain of these exemplary processes may obfuscate the actual elements of confidential customer data while maintaining a referential integrity of the columns of the source data tables during not only a performance of one or more of the exemplary anonymization processes described herein, but also during an implementation of one or more SQL-based join operations involving these source data tables. Further, through a replacement of the actual elements of confidential customer data within corresponding columns of the one or more source data tables with selectively anonymized, type-preserving data elements, certain of these exemplary processes may also may enable the computing components of one or more distributed computing systems, such as distributed modelling system 170, to process selectively anonymized customer data that maintains a format, structure, or composition of responsive ones of the actual elements of confidential customer data, and generate corresponding feature vectors that satisfy the one or more composition-specific, statistical benchmarks and that are suitable for ingestion by the machine-learning or artificial-intelligence processes during training, validation, and inferencing phases.

FI computing system 130 may also perform operations, described herein, to update a delta table associated with the accessed source data table to reflect the completion of the anonymization of the confidential customer data maintained within the identified columns of selected temporal partition in accordance with the elements of configuration data associated with accessed source data table 142 (e.g. in step 628 of FIG. 6B). Exemplary process 620 is then complete in step 630.

Referring back to FIG. 5, and upon completion of the exemplary de-risking operations described herein (e.g., the exemplary tokenization processes described in FIG. 6A or the exemplary anonymization operations described in FIG. 6B), FI computing system 130 may determine, based on the delta table associated with the accessed source data table, whether additional temporal partitions of the accessed source data table await an application of one or more of the exemplary pre-processing or de-risking operations described herein (e.g., in step 518 of FIG. 5). If FI computing system 130 were to establish that additional temporal partitions of the accessed source data table await pre-processing or de-risking (step 518; YES), exemplary process 500 may pass back to step 508, and FI computing system 130 perform any of the exemplary processes described herein to select an additional one of the temporal partitions of the accessed source data table.

Alternatively, if FI computing system 130 were to establish that no additional temporal partitions of the accessed source data table await pre-processing or de-risking (step 518; NO), FI computing system 130 may perform operations that, based on corresponding delta tables maintained within the locally accessible data repository, determine whether the locally accessible data repository maintains additional source data tables having temporal partitions that await an application of one or more of the exemplary pre-processing or de-risking operations described herein (e.g., in step 520 of FIG. 5). If FI computing system 130 were to establish that temporal partitions of one or more of the additional source data tables await pre-processing or de-risking (step 520; YES), exemplary process 500 may pass back to step 502, and FI computing system 130 perform any of the exemplary processes described herein to select an additional one of the source data tables.

Alternatively, if FI computing system 130 were to establish that no additional source data tables of the locally accessible data repository include temporal partitions awaiting pre-processing or de-risking (step 520; NO), FI computing system 130 may perform any of the exemplary processes described herein to implement selectively one or more SQL-based operations (e.g., one or more SQL-based join operations) involving each, or a selected subset of, the de-risked source data tables maintained within the locally accessible data repository, either alone or in conjunction with one or more table-specific exclusion operations specified within corresponding elements of configuration data maintained within configuration data store 138 (e.g., in step 522 of FIG. 5). Based on the selective implementation of the one or more SQL-based operations and/or the table-specific exclusion operations, FI computing system 130 may perform any of the exemplary processes described herein to generate a de-risked data table (e.g., one of tokenized data table 310 of FIG. 3A or anonymized data table 326 of FIG. 3B), which FI computing system 130 may provision to one or more computing systems associated with a distributed data repository accessible across network 120, such as distributed data repository 180, or to distributed modelling system 170 (e.g., in step 524 of FIG. 5). Exemplary process 500 is then complete in step 526.

Referring back to step 510, if FI computing system 130 were to determine that the selected temporal partition does not await pre-processing (e.g., step 510; NO), exemplary process 500 may advance to step 514, and FI computing system 130 may determine whether the selected temporal partition awaits de-risking using any of the exemplary processes described herein. Further, and in reference to step 514, if FI computing system 130 were to determine that the selected temporal partition does not await de-risking (e.g., step 514; NO), exemplary process 500 may advance step 518, and FI computing system may perform operation that determine, based on the delta table associated with the accessed source data table, whether additional temporal partitions of the accessed source data table await an application of one or more of the exemplary pre-processing or de-risking operations described herein.

Figure 7:
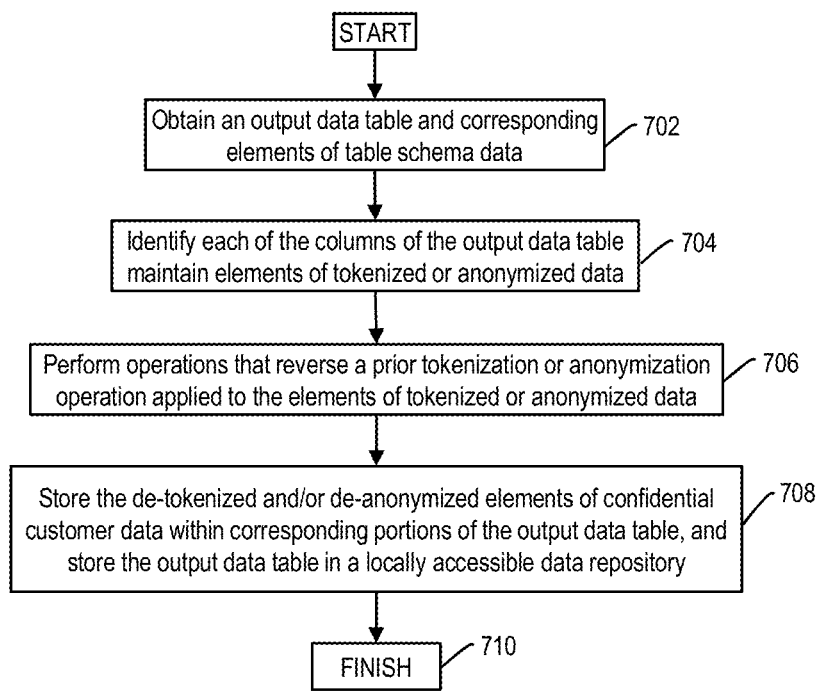
FIG. 7 is a flowchart of an exemplary process for reversing one or more de-risking operations previously applied to elements of confidential customer data, in accordance with some exemplary embodiments.

FIG. 7 is a flowchart of an exemplary process 700 for reversing one or more de-risking operations previously applied to elements of confidential customer data, in accordance with some exemplary embodiments. In some instances, one or more computing systems, such as, but not limited to, one or more of the distributed components of FI computing system 130, may perform one or more of the steps of exemplary process 700, as described herein. Referring to FIG. 7, FI computing system 130 may obtain an output data table that includes one or more elements of customer-specific predicted output data, and corresponding elements of table schema data associated with the output data table (e.g., in step 702 of FIG. 7).

As described herein, the output data table may maintain the elements of customer-specific predicted output data, elements of tokenized or anonymized elements of confidential customer data, and/or elements of non-confidential customer data within corresponding within a plurality of customer-specific rows and within corresponding columns, and the elements of table schema data may identify each of the columns maintained within the output data table (e.g., via a column or field name), and may associate each of the column names with a structure, format, or composition of corresponding ones of the elements of tokenized or anonymized data and/or the elements of non-confidential data. By way of example, and for a particular column of the output data table that includes tokenized or anonymized data, the corresponding elements of table schema data may include data specifying that the particular column of the output data table includes elements of tokenized data (e.g., digital tokens) or type-preserving elements of fully or partially anonymized data, and when the particular column includes the type-preserving elements of fully or partially anonymized data, the corresponding elements of the table schema data may also specify a structure, format, or composition of the fully or partially anonymized data. In some instances, distributed modelling system 170 may perform operations, described herein, to generate the output data table based on an application of one or more trained, machine-learning or artificial-intelligence processes to feature vectors including tokenized or anonymized elements of confidential customer data, and FI computing system 130 may receive the output data table and the elements of table schema data from distributed modelling system across network 120.

Based on the elements of table schema data, FI computing system 130 may perform any of the exemplary processes described herein to identify each of the columns of the output data table maintain elements of tokenized or anonymized data (e.g., in step 704 of FIG. 7). Further, and for each of the identified columns, FI computing system 130 may also perform any of the exemplary processes that reverse a corresponding one of the tokenization or anonymization processes, and replace each of the elements of tokenized or anonymized data with a corresponding element of confidential customer data (e.g., in step 706 of FIG. 7). By way of example, in step 706, FI computing system 130 may perform any of the exemplary processes described herein to replace each of the elements of tokenized data (e.g., a unique digital token) within a particular one of the identified columns with a corresponding elements of confidential customer data maintained within the elements of token-based mapping data, In other examples, and for an additional one of the identified columns, FI computing system 130 may perform any of the exemplary processes described herein, in step 706, to replace each of the type-preserving elements of fully or partially anonymized data with a corresponding element of confidential customer data.

FI computing system 130 may also perform operations, described herein, to store the de-tokenized and/or de-anonymized elements of confidential customer data within corresponding portions of the output data table, which FI computing system 130 may maintained within a locally accessible data repository (e.g., in step 708 of FIG. 7). Exemplary process 700 is then complete in step 710.

III. Exemplary Computing Architectures

Examples of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Exemplary embodiments of the subject matter described in this specification, such as, but not limited to, ingestion engine 162, de-risking engine 164, application programming interfaces (APIs) 206 and 406, pre-processing module 230, tokenization module 302, post-processing module 312, provisioning module 316, anonymization module 318, and reversal module 407, can be implemented as one or more computer programs, i.e., one or more modules of computer program instructions encoded on a tangible non-transitory program carrier for execution by, or to control the operation of, a data processing apparatus (or a computer system or a computing device).

Additionally, or alternatively, the program instructions can be encoded on an artificially generated propagated signal, such as a machine-generated electrical, optical, or electromagnetic signal that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The terms "apparatus," "device," and "system" (e.g., the FI computing system and the customer device described herein) refer to data processing hardware and encompass all kinds of apparatus, devices, and machines for processing data, including, by way of example, a programmable processor such as a graphical processing unit (GPU) or central processing unit (CPU), a computer, or multiple processors or computers. The apparatus, device, or system can also be or further include special purpose logic circuitry, such as an FPGA (field programmable gate array) or an ASIC (application-specific integrated circuit). The apparatus, device, or system can optionally include, in addition to hardware, code that creates an execution environment for computer programs, such as code that constitutes processor firmware, a protocol stack, a database management system, an operating system, or a combination of one or more of them.

A computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, such as one or more scripts stored in a markup language document, in a single file dedicated to the program in question, or in multiple coordinated files, such as files that store one or more modules, sub-programs, or portions of code. A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, such as an FPGA (field programmable gate array), an ASIC (application-specific integrated circuit), one or more processors, or any other suitable logic.

Computers suitable for the execution of a computer program (such as, but not limited to, the FI computing systems described herein) may include, by way of example, general or special purpose microprocessors or both, or any other kind of central processing unit. Generally, a CPU will receive instructions and data from a read-only memory or a random-access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, such as magnetic, magneto-optical disks, or optical disks. However, a computer need not have such devices. Moreover, a computer can be embedded in another device, such as a mobile telephone, a personal digital assistant (PDA), a mobile audio or video player, a game console, a Global Positioning System (GPS) receiver, or a portable storage device, such as a universal serial bus (USB) flash drive.

Further, in some examples, one or more of the computing systems described herein (such as, but not limited to, one or more of the FI computing systems) may correspond to a distributed or cloud-based computing system having multiple computing components distributed across an appropriate computing network. For example, the distributed or cloud-based computing system may correspond to a private distributed or cloud-based computing cluster that is associated with the financial institution described herein. Additionally, or alternatively, the distributed or cloud-based computing system may correspond to a publicly accessible, distributed or cloud-based computing cluster, such as a computing cluster maintained by Microsoft Azure™, Amazon Web Services™, Google Cloud™, or another third-party provider unrelated to the financial institution. In some instances, the distributed computing components of the distributed or cloud-based computing system may be configured to implement one or more parallelized, fault-tolerant distributed computing and analytical processes, such as processes provisioned by an Apache Spark™ distributed, cluster-computing framework or a Databricks™ analytical platform. Further, and in addition to the CPUs described herein, the distributed computing components may also include one or more graphics processing units (GPUs) capable of processing thousands of operations (e.g., vector operations) in a single clock cycle, and additionally, or alternatively, one or more tensor processing units (TPUs) capable of processing hundreds of thousands of operations (e.g., matrix operations) in a single clock cycle.

Computer-readable media suitable for storing computer program instructions and data include all forms of non-volatile memory, media and memory devices, including by way of example semiconductor memory devices, such as EPROM, EEPROM, and flash memory devices; magnetic disks, such as internal hard disks or removable disks; magneto-optical disks; and CD-ROM and DVD-ROM disks. The processor and the memory can be supplemented by, or incorporated in, special purpose logic circuitry.

To provide for interaction with a user (e.g., the customer or employee described herein), embodiments of the subject matter described in this specification can be implemented on a computer having a display unit, such as a CRT (cathode ray tube) or LCD (liquid crystal display) monitor, a TFT display, or an OLED display, for displaying information to the user and a keyboard and a pointing device, such as a mouse or a trackball, by which the user can provide input to the computer. Other kinds of devices can be used to provide for interaction with a user as well; for example, feedback provided to the user can be any form of sensory feedback, such as visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser.

Implementations of the subject matter described in this specification can be implemented in a computing system that includes a back-end component, such as a data server, or that includes a middleware component, such as an application server, or that includes a front-end component, such as a computer having a graphical user interface or a Web browser through which a user can interact with an implementation of the subject matter described in this specification, or any combination of one or more such back-end, middleware, or front-end components. The components of the system can be interconnected by any form or medium of digital data communication, such as a communication network. Examples of communication networks include a local area network (LAN) and a wide area network (WAN), such as the Internet.

The computing system can include clients and servers. A client and server are generally remote from each other and typically interact through a communication network. The relationship of client and server arises by virtue of computer programs running on the respective computers and having a client-server relationship to each other. In some implementations, a server transmits data, such as an HTML page, to a user device, such as for purposes of displaying data to and receiving user input from a user interacting with the user device, which acts as a client. Data generated at the user device, such as a result of the user interaction, can be received from the user device at the server.

While this specification includes many specifics, these should not be construed as limitations on the scope of the invention or of what may be claimed, but rather as descriptions of features specific to particular embodiments of the invention. Certain features that are described in this specification in the context of separate embodiments may also be implemented in combination in a single embodiment. Conversely, various features that are described in the context of a single embodiment may also be implemented in multiple embodiments separately or in any suitable sub-combination. Moreover, although features may be described above as acting in certain combinations and even initially claimed as such, one or more features from a claimed combination may in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems may generally be integrated together in a single software product or packaged into multiple software products.

In this application, the use of the singular includes the plural unless specifically stated otherwise. In this application, the use of "or" means "and/or" unless stated otherwise. Furthermore, the use of the term "including," as well as other forms such as "includes" and "included," is not limiting. In addition, terms such as "element" or "component" encompass both elements and components comprising one unit, and elements and components that comprise more than one subunit, unless specifically stated otherwise. The section headings used herein are for organizational purposes only, and are not to be construed as limiting the described subject matter.

Various embodiments have been described herein with reference to the accompanying drawings. It will, however, be evident that various modifications and changes may be made thereto, and additional embodiments may be implemented, without departing from the broader scope of the disclosed embodiments as set forth in the claims that follow.

Further, other embodiments will be apparent to those skilled in the art from consideration of the specification and practice of one or more embodiments of the present disclosure. It is intended, therefore, that this disclosure and the examples herein be considered as exemplary only, with a true scope and spirit of the disclosed embodiments being indicated by the following listing of exemplary claims.

What is claimed is:

1. An apparatus, comprising:
a communications interface;
a memory storing instructions; and
at least one processor coupled to the communications interface and the memory, the at least one processor being configured to execute the instructions to:
access a source data table, and obtain configuration data and a delta table associated with the source data table, the configuration data comprising an identifier of a column of the source data table that includes elements of confidential data, and the delta table comprising data that identifies a de-risking operation associated with the column of the source data table;
based on the configuration data, perform operations that apply the de-risking operation to the elements of confidential data within the column of the source data table and generate anonymized elements of confidential data, the anonymized elements of confidential data establishing an anonymized column within the source data table; and
perform operations that provision an anonymized data table that includes the anonymized column to at least one computing system via the communications interface, the at least one computing system being configured to process the anonymized data table and generate an output data table that includes the anonymized column, the anonymized column maintaining a referential integrity between the source data table and the output data table.

2. The apparatus of claim 1, wherein:
the anonymized elements of confidential data preserve at least one of a format, a structure, or a composition of the elements of confidential data; and
the at least one computing system is configured to apply a trained machine-learning or artificial intelligence process to portions of the anonymized data table.

3. The apparatus of claim 1, wherein the at least one processor is further configured to:
store, within a portion of the delta table, update data associated with a performance of the operations that anonymize the elements of confidential data within the column of the source data table.

4. The apparatus of claim 3, wherein:
the source data table comprises a plurality of temporal partitions;
the de-risking operation is associated with one or more of the temporal partitions;
the delta table comprises data that identifies each of the temporal partitions and the de-risking operation associated with the one or more of the temporal partitions, each of the temporal partitions being associated with a corresponding temporal interval; and
the at least one processor is further configured to execute the instructions to:
select a corresponding one of the temporal partitions based on the delta table; and
based on the configuration data, perform the operations that anonymize the elements of confidential data within the column of the corresponding temporal partition of the source data table.

5. The apparatus of claim 1, wherein:
the configuration data further comprises an identifier of an additional column of the source data table and information characterizing a pre-processing operation associated with the additional column, the pre-processing operations comprising a full-redaction operation or a partial-redaction operation; and
the at least one processor is further configured to execute the instructions to apply the pre-processing operation to elements of data within the additional column based on the configuration data.

6. The apparatus of claim 5, wherein the at least one processor is further configured to execute the instructions to:
store, within a portion of the delta table, update data associated with an application of the pre-processing operation to the elements of data within the additional column.

7. The apparatus of claim 1, wherein the at least one processor is further configured to execute the instructions to
obtain elements of table schema data associated with the source data table, the elements of table schema data comprising the identifier of the column and information characterizing at least one of a format, a structure, or a composition of the elements of confidential data; and
access the elements of confidential data within the column of the source data table based on the elements of table schema data.

8. The apparatus of claim 7, wherein the at least one processor is further configured to execute the instructions to:
obtain type-preserving mapping data that includes a first one of the elements of confidential data;
obtain, from the elements of type-preserving mapping data, a first element of anonymized data associated with the first element of confidential data; and
perform operations that replace the first element of confidential data within the column of the source data table with the first element of anonymized data.

9. The apparatus of claim 8, wherein the at least one processor is further configured to execute the instructions to:
determine that the type-preserving mapping data fails to include a second one of the elements of confidential data;
based on the elements of table schema data, generate a second element of anonymized data associated with the second element of confidential data; and
perform operations that replace the second element of confidential data within the column of the source data table with the second element of anonymized data.

10. The apparatus of claim 8, wherein the anonymized elements of confidential data comprise at least one of an element of fully anonymized data or an element of partially anonymized data.

11. The apparatus of claim 1, wherein the at least one processor is further configured to execute the instructions to generate the anonymized data table based on an application of a join operation to the anonymized column within the source data table and to a corresponding anonymized column within one or more additional source data tables.

12. The apparatus of claim 1, wherein the at least one processor is further configured to execute the instructions to:
obtain additional configuration data associated with an additional source data table, the configuration data comprising an identifier of a column of the additional source data table that includes additional elements of confidential data;

based on the additional configuration data, access the additional elements of confidential data within the column of the additional source data table;

obtain elements of token-based mapping data that associate each of the additional elements of confidential data with a corresponding digital token;

obtain, from the elements of token-based mapping data, the corresponding digital token associated with each of the additional elements of confidential data, and perform operations that replace each of the additional elements of confidential data within the column with the corresponding digital token, the digital tokens establishing a tokenized column within the additional source data table; and perform operations that provision a tokenized data table that includes the tokenized column to the at least one computing system via the communications interface.

13. A computer-implemented method, comprising:

using at least one processor, accessing a source data table, and obtaining configuration data and a delta table associated with the source data table, the configuration data comprising an identifier of a column of the source data table that includes elements of confidential data, and the delta table comprising data that identifies a de-risking operation associated with the column of the source data table;

based on the configuration data, performing operations, using the at least one processor, that apply the de-risking operation to the elements of confidential data within the column of the source data table and generate anonymized elements of confidential data, the anonymized elements of confidential data establishing an anonymized column within the source data table; and performing operations, using at least one processor, that provision an anonymized data table that includes the anonymized column to at least one computing system, the at least one computing system being configured to process the anonymized data table and generate an output data table that includes the anonymized column, the anonymized column maintaining a referential integrity between the source data table and the output data table.

14. The computer-implemented method of claim 13, wherein:

the anonymized elements of confidential data preserve at least one of a format, structure, or composition of the elements of confidential data;

the anonymized elements of confidential data comprise at least one of an element of fully anonymized data or an element of partially anonymized data; and the at least one computing system being configured to apply a trained machine-learning or artificial-intelligence process to portions of the anonymized data table.

15. The computer-implemented method of claim 13, wherein:

the source data table comprises a plurality of temporal partitions;

the de-risking operation is associated with one or more of the temporal partitions; and the computer-implemented method further comprises:

obtaining, using the at least one processor, the delta table associated with the source data table, the delta table comprising data that identifies each of the temporal partitions and the de-risking operation associated with the one or more of the temporal partitions, each of the temporal partitions being associated with a corresponding temporal interval;

selecting, using the at least one processor, a corresponding one of the temporal partitions based on the delta table; and performing the operations that anonymize the elements of confidential data within the column of the corresponding temporal partition.

16. The computer-implemented method of claim 13, wherein:

the configuration data further comprises an identifier of an additional column of the source data table and information characterizing a pre-processing operation associated with the additional column, the pre-processing operations comprising a full-redaction operation or a partial-redaction operation; and the computer-implemented method further comprises applying, using the at least one processor, the pre-processing operation to elements of data within the additional column based on the configuration data.

17. The computer-implemented method of claim 13, wherein performing the operations that anonymize the elements of confidential data comprises:

obtaining type-preserving mapping data that includes a first one of the elements of confidential data;

obtaining, from the elements of type-preserving mapping data, a first element of anonymized data associated with the first element of confidential data; and performing operations that replace the first element of confidential data within the column of the source data table with the first element of anonymized data.

18. The computer-implemented method of claim 17, wherein performing the operations that anonymize the elements of confidential data comprises:

determining that the type-preserving mapping data fails to include a second one of the elements of confidential data;

based on the elements of table schema data, generating a second element of anonymized data associated with the second element of confidential data; and performing operations that replace the second element of confidential data within the column of the source data table with the second element of anonymized data.

19. The computer-implemented method of claim 13, further comprising generating, using the at least one processor, the anonymized data table based on an application of a join operation to the anonymized column within the source data table and to a corresponding anonymized column within one or more additional source data tables.

20. A tangible, non-transitory computer-readable medium storing instructions that, when executed by at least one processor, cause the at least one processor to perform a method, comprising:

accessing a source data table, and obtaining configuration data and a delta table associated with the source data table, the configuration data comprising an identifier of a column of the source data table that includes elements of confidential data, and the delta table comprising data that identifies a de-risking operation associated with the columns of the source data table;

based on the configuration data, performing operations that apply the de-risking operation to the elements of confidential data within the column of the source data table and generate anonymized elements of confidential data, the anonymized elements of confidential data establishing an anonymized column within the source data table; and performing operations that provision an anonymized data table that includes the anonymized column to at least one computing system, the at least one computing system being configured to process the anonymized data table and generate an output data table that includes the anonymized column, the anonymized column maintaining a referential integrity between the source data table and the output data table.

* * * * *